United States Patent
Kuech et al.

(10) Patent No.: US 9,699,552 B2
(45) Date of Patent: Jul. 4, 2017

(54) ECHO SUPPRESSION COMPRISING MODELING OF LATE REVERBERATION COMPONENTS

(71) Applicant: Fraunhofer-Gesellschaft zur Foerderung der angewandten Forschung e.V., Munich (DE)

(72) Inventors: Fabian Kuech, Erlangen (DE); Markus Schmidt, Erlangen (DE); Alexis Favrot, Suhr (CH); Christof Faller, St-Sulpice (CH)

(73) Assignee: Faunhofer-Gesellschaft zur Foerderung der angewandten, Munich (DE)

( * ) Notice: Subject to any disclaimer, the term of this patent is extended or adjusted under 35 U.S.C. 154(b) by 435 days.

(21) Appl. No.: 13/867,311

(22) Filed: Apr. 22, 2013

(65) Prior Publication Data

US 2013/0230184 A1 Sep. 5, 2013

Related U.S. Application Data

(63) Continuation of application No. PCT/EP2011/067486, filed on Oct. 6, 2011.
(Continued)

(30) Foreign Application Priority Data

Dec. 10, 2010 (EP) .................... 10194586

(51) Int. Cl.
*H04R 3/00* (2006.01)
*H04M 9/08* (2006.01)
*G10L 21/0208* (2013.01)

(52) U.S. Cl.
CPC ............ *H04R 3/002* (2013.01); *H04M 9/085* (2013.01); *G10L 2021/02082* (2013.01)

(58) Field of Classification Search
CPC ... G10K 2210/3012; G10K 2210/3014; G10K 2210/30232; G10K 2210/3028;
(Continued)

(56) References Cited

U.S. PATENT DOCUMENTS

| 5,999,828 | A  | 12/1999 | Sih et al. |
| 6,606,382 | B2 | 8/2003  | Gupta |

(Continued)

FOREIGN PATENT DOCUMENTS

| CN | 101040512 A | 9/2007 |
| CN | 101273618 A | 9/2008 |

(Continued)

OTHER PUBLICATIONS

A. Favrot, C. Faller, M. Kallinger, F. Küch, and M. Schmidt, "Acoustic Echo Control Based on Temporal Fluctuations of Short-Time Spectra," in Proc. Int. Works. on Acoust. Echo and Noise Contrl., Sep. 2008.*

(Continued)

*Primary Examiner* — Curtis Kuntz
*Assistant Examiner* — Qin Zhu
(74) *Attorney, Agent, or Firm* — Keating & Bennett, LLP

(57) ABSTRACT

An apparatus for computing filter coefficients for an adaptive filter is disclosed. The adaptive filter is used for filtering a microphone signal so as to suppress an echo due to a loudspeaker signal. The apparatus has: an echo decay modeling means for modeling a decay behavior of an acoustic environment and for providing a corresponding echo decay parameter; and computing means for computing the filter coefficients of the adaptive filter on the basis of the echo decay parameter. A corresponding method has: providing echo decay parameters determined by means of an echo
(Continued)

decay modeling means; and computing the filter coefficients of the adaptive filter on the basis of the echo decay parameters.

21 Claims, 9 Drawing Sheets

Related U.S. Application Data

(60) Provisional application No. 61/406,246, filed on Oct. 25, 2010.

(58) Field of Classification Search
CPC ........ H04B 15/00; H04B 15/005; H04B 3/20; G10L 2021/02165; G10L 21/0208; G10L 21/0232; H03F 3/187
See application file for complete search history.

(56) References Cited

U.S. PATENT DOCUMENTS

| | | | |
|---|---|---|---|
| 6,842,516 B1 | 1/2005 | Armbrüster | |
| 2003/0123674 A1* | 7/2003 | Boland | H04M 9/082 381/66 |
| 2007/0071254 A1* | 3/2007 | Marton | H04M 9/082 381/94.3 |
| 2007/0116255 A1 | 5/2007 | Derkx et al. | |
| 2007/0165871 A1* | 7/2007 | Roovers | H04R 3/02 381/66 |
| 2008/0085009 A1* | 4/2008 | Merks | H04M 9/082 381/66 |
| 2008/0192946 A1* | 8/2008 | Faller | H04M 9/082 381/66 |
| 2008/0292109 A1 | 11/2008 | Trump et al. | |
| 2009/0003615 A1* | 1/2009 | Roovers | H04R 3/005 381/66 |
| 2009/0043570 A1* | 2/2009 | Fukuda | G10L 15/20 704/211 |
| 2009/0117948 A1* | 5/2009 | Buck et al. | 455/570 |
| 2009/0154717 A1* | 6/2009 | Hoshuyama | 381/66 |
| 2009/0248403 A1* | 10/2009 | Kinoshita | H04R 3/04 704/219 |
| 2010/0211382 A1* | 8/2010 | Sugiyama | H04B 3/23 704/205 |
| 2010/0246844 A1* | 9/2010 | Wolff | G10L 21/02 381/66 |
| 2010/0316228 A1* | 12/2010 | Baran | H04M 9/082 381/66 |
| 2011/0019833 A1 | 1/2011 | Kuech et al. | |

FOREIGN PATENT DOCUMENTS

| | | |
|---|---|---|
| JP | 2002-521871 A | 7/2002 |
| JP | 2007-514358 A | 5/2007 |
| JP | 2008-516545 A | 5/2008 |
| RU | 2 199 180 C2 | 2/2003 |
| RU | 2 277 301 C2 | 5/2006 |
| RU | 2008 127 412 A | 1/2010 |
| WO | 2005/057804 A1 | 6/2005 |
| WO | 2006/040734 A1 | 4/2006 |
| WO | 2009095161 A1 | 8/2009 |

OTHER PUBLICATIONS

Official Communication issued in corresponding Japanese Patent Application No. 2013-535345, mailed on Dec. 2, 2014.
Official Communication issued in International Patent Application No. PCT/EP2011/067486, mailed on Nov. 24, 2011.
Jot et al., "Analysis and Synthesis of Room Reverberation Based on a Statistical Time-Frequency Model," 103th AES Convention Preprint, Sep. 30, 1997, 31 pages.
Official Communication issued in corresponding Japanese Patent Application No. 2013-535345, mailed on Apr. 15, 2014.
Official Communication issued in corresponding Chinese Patent Application No. 201180060885.9, mailed on May 6, 2014.
Official Communication issued in corresponding Russian Patent Application No. 2013123696, mailed on Jul. 9, 2015.

\* cited by examiner

ECHO SUPPRESSION COMPRISING MODELING OF LATE REVERBERATION COMPONENTS

CROSS-REFERENCE TO RELATED APPLICATIONS

This application is a continuation of copending International Application No. PCT/EP2011/067486, filed Oct. 6, 2011, which is incorporated herein by reference in its entirety, and which additionally claims priority from U.S. Provisional Application No. 61/406,246, filed Oct. 25, 2010, and from European Application No. 10194586.3, filed Dec. 10, 2010, which are also incorporated herein by reference in their entirety.

BACKGROUND OF THE INVENTION

Embodiments of the present invention relate to apparatus and methods for computing filter coefficients for an adaptive filter for filtering a microphone signal so as to suppress an echo due to a loudspeaker signal, as may be employed, for example, within the context of conference systems. Examples of conference systems include telephone conference systems, video conference systems or other bi-directional conference systems.

Acoustic echoes arise whenever tones, sounds and noises from a loudspeaker are picked up by a microphone located in the same room or in the same acoustic environment. In telecommunication systems, this acoustic feedback signal is transmitted back to the far-end subscriber, who notices a delayed version of their own speech. In this context, echo signals represent a very distracting disturbance and may even inhibit interactive full-duplex communication. Additionally, acoustic echoes may result in howling effects and other instabilities of the acoustic feedback loop.

WO 2006/111370 A1 relates to a method and an apparatus for removing an echo in a multichannel audio signal. Acoustic echo control and noise suppression are an important part of any hands-free telecommunication system such as telephone, audio or video conference systems. The method, described in the document, of processing multichannel audio loudspeaker signals and at least one microphone signal in this context includes the steps of transforming the input microphone signal to input microphone short-time spectra, computing a combined loudspeaker signal short-time spectrum from the loudspeaker signals, computing a combined microphone signal short-time spectrum from the input microphone signal, estimating a magnitude spectrum or a power spectrum of the echo in the combined microphone signal short-time spectrum, computing a gain filter for magnitude modification of the input microphone short-time spectrum, applying the gain filter to at least one input microphone spectrum, and converting the filtered input microphone spectrum to the time domain.

Echo suppression and echo cancellation systems as are employed today and may also be referred to as echo removal systems in summary, frequently have the problem that they do not cope with different sound, tone, noise components, and echo components in an optimum manner despite the use of adaptive filters. If one component is predominant as compared to another, a non-optimum suppression of the echo of the loudspeaker signal may occur in the microphone signal of such a communication system, for example. On the other hand, in the case of a deviating composition of the components of the different sources, tonal artifacts may arise due to the utilization of an echo suppression or echo cancellation system, which tonal artifacts are also perceived as extremely annoying.

EP 1 429 315 A1 refers to a method and system for suppressing echoes and noise in environments under variable acoustic conditions as well as conditions of a large feedback proportion. The system for canceling echoes and noises in environments with variable acoustic conditions and high feedback, such as the interior of an automotive vehicle, permitting audible communication between the occupants, comprises one or several microphones for a speech signal and A/D, D/A converters, amplification and filtering means generating an electric signal reproduced as an acoustic signal by a speaker, and an echo canceller using the signal and an electric signal from the microphone integrating the feedback signal of the signal, another speech signal and noise seized by the microphone. The system is applied to eliminating the feedback, by providing an additional filtering of an electric output signal of the canceling device, after treatment of the signal, comprising a time variant filter that suppresses the residual acoustic echo not cancelled by the system and the noise seized by the microphones.

WO 2009/095161 A1 relates to an apparatus and a method for computing filter coefficients for echo suppression. The filter coefficients are intended to be used with an adaptive filter for filtering a microphone signal so as to suppress an echo due to a loudspeaker signal. The apparatus includes extraction means for extracting a stationary component signal or a non-stationary component signal from the loudspeaker signal or from a signal derived from the loudspeaker signal. The apparatus also comprises computing means for computing the filter coefficients for the adaptive filter on the basis of the extracted stationary component signal and the non-stationary component signal. The apparatus and method disclosed in WO 2009/095161 examine the far-end signal with respect to statistical properties of the component signal that constitute the loudspeaker signal.

SUMMARY

According to an embodiment, an apparatus for computing filter coefficients for an adaptive filter for filtering a microphone signal captured by a microphone so as to suppress an echo due to a loudspeaker signal output by a loudspeaker may have: an echo decay modeling means for modeling a decay behavior of an acoustic environment and for providing a corresponding echo decay parameter; and computing means for computing the filter coefficients of the adaptive filter on the basis of the echo decay parameter.

According to another embodiment, a method for computing filter coefficients for an adaptive filter for filtering a microphone signal so as to suppress an echo due to a loudspeaker signal may have the steps of: providing echo decay parameters determined by means of an echo decay modeling means; and computing the filter coefficients of the adaptive filter on the basis of the echo decay parameters.

According to another embodiment, an apparatus for computing filter coefficients for an adaptive filter for filtering a microphone signal captured by a microphone so as to suppress an echo due to a loudspeaker signal output by a loudspeaker may have: an echo decay modeling means for modeling a decay behavior of an acoustic environment and for providing a corresponding echo decay parameter; an echo processing means for estimating an echo frequency spectrum or an echo power spectrum of the echo within the microphone signal, the echo processing means being arranged to estimate an early echo component and a late echo component, at least the estimation of the late echo component using the echo decay parameter, and further arranged to estimate the echo frequency spectrum or the echo power spectrum on the basis of the early echo component and the late echo component; and computing means for computing the filter coefficients of the adaptive filter on the basis of the echo decay parameter and on the basis of the echo frequency spectrum or the echo power spectrum of the echo within the microphone signal; characterized in that the echo processing means has a maximum selector for selecting a maximum echo estimation among the early echo estimation and the late echo estimation as the echo frequency spectrum or the echo power spectrum.

According to another embodiment, a method for computing filter coefficients for an adaptive filter for filtering a microphone signal so as to suppress an echo due to a loudspeaker signal may have the steps of: providing echo decay parameters determined by means of an echo decay modeling means; estimating an echo frequency spectrum or an echo power spectrum of the echo within the microphone signal, by estimating an early echo component and a late echo component, at least an estimation of the late echo component using the echo decay parameter; estimating the echo frequency spectrum or the echo power spectrum on the basis of the early echo component and the late echo component; selecting a maximum echo estimation among the early echo estimation and the late echo estimation as the echo frequency spectrum or the echo power spectrum; and computing the filter coefficients of the adaptive filter on the basis of the echo decay parameters and on the basis of an echo frequency spectrum or an echo power spectrum of an the echo within the microphone signal.

According to another embodiment, an apparatus for computing filter coefficients for an adaptive filter for filtering a microphone signal captured by a microphone so as to suppress an echo due to a loudspeaker signal output by a loudspeaker may have: an echo decay modeling means for modeling a decay behavior of an acoustic environment and for providing a corresponding echo decay parameter; computing means for computing the filter coefficients of the adaptive filter on the basis of the echo decay parameter, wherein the computing means is further arranged to determine an early echo removal filter and a late echo removal filter; and a filter setting means arranged to determine the filter coefficients of the adaptive filter on the basis of a minimum selection among the early echo removal filter and the late echo removal filter.

According to another embodiment, a method for computing filter coefficients for an adaptive filter for filtering a microphone signal so as to suppress an echo due to a loudspeaker signal may have the steps of: providing echo decay parameters determined by means of an echo decay modeling means; and computing the filter coefficients of the adaptive filter on the basis of the echo decay parameters by determining an early echo removal filter and a late echo removal filter; and determining the filter coefficients of the adaptive filter on the basis of a minimum selection among the early echo removal filter and the late echo removal filter.

Another embodiment may have a program having a program code for performing the methods of computing as mentioned before, when the program runs on a processor.

One embodiment of an apparatus for computing filter coefficients for an adaptive filter for filtering a microphone signal captured by a microphone so as to suppress an echo due to a loudspeaker signal output by a loudspeaker comprises an echo decay modeling means for modeling a decay behavior of an acoustic environment and for providing a corresponding echo decay parameter or a plurality of echo decay parameters; and computing means for computing the filter coefficients of the adaptive filter on the basis of the echo decay parameter(s).

One embodiment of method for computing filter coefficients for an adaptive filter for filtering a microphone signal so as to suppress an echo due to a loudspeaker signal comprises: providing echo decay parameters determined by means of an echo decay modeling means; and computing the filter coefficients of the adaptive filter on the basis of the echo decay parameters.

Embodiments of the apparatus, the method, and the computer program according to the teachings disclosed herein are based on the finding that improvement of the audio quality and/or a reduction of computational effort may be achieved by modeling especially the late echo components by an echo decay model. The echo decay model may rely on recursive calculations which necessitate relatively little computational effort. The echo decay of the acoustic environment in which the adaptive filter is used may present changing properties which may be estimated from samples of the microphone signal and/or the loudspeaker signal.

While early echo components typically are quite similar to the original sound, later echo components become more and more indistinct and less similar to the original sound. The apparatus, the method, and the computer program according to the teachings disclosed herein distinguish between the suppression of early echo components, which necessitate a higher accuracy, and the suppression of late echo components, which may be estimated less accurately over the entire reverberation time. In contrast to exploiting different statistical properties of various signal constituents, such as stationary or non-stationary, that are inherent to the corresponding constituents of the original microphone and loudspeaker signals (i.e., they are not influenced by the acoustic environment), the teachings disclosed herein utilize properties of the echo caused by the loudspeaker signal. These echo-related properties are associated with the acoustic environment 120 and thus vary upon changing or reconfiguring the acoustic environment. However, the echo-related properties do not vary, or at least not in a significant way, when the loudspeaker or microphone signals vary, for example with respect to a ratio between stationary components and non-stationary components.

Further embodiments will be described, in the further course of the present description, with regard to their structures and modes of operation. Depending on the specific embodiment, the echo decay parameter(s) may be estimated from the respective signals, for example the microphone signal which has been influenced by a system response of the acoustic environment. An apparatus in accordance with an embodiment of the teachings of this document may further comprise echo suppression filtering means configured to filter the microphone signal on the basis of the filter coefficients. An apparatus in accordance with the teachings disclosed herein may comprise echo estimation means for estimating an echo frequency spectrum or an echo power spectrum of the echo within the microphone signal. The estimation of the echo frequency spectrum or the echo power spectrum may be divided into an estimation of early echo components and an estimation of late echo components. The estimation of the early echo components may be different from the estimation of the late echo components. The estimation of the late echo components may span a relatively long time interval after an original sound at relatively low computational effort. The estimation of the early echo components may be relatively precise and cover a relatively short time interval after the original sound.

BRIEF DESCRIPTION OF THE DRAWINGS

Embodiments of the teachings disclosed in this document will be explained below in more detail with reference to the accompanying drawings. Embodiments of the teachings disclosed herein may therefore be better understood with regard to the following drawings.

DETAILED DESCRIPTION OF THE INVENTION

Figure 1:
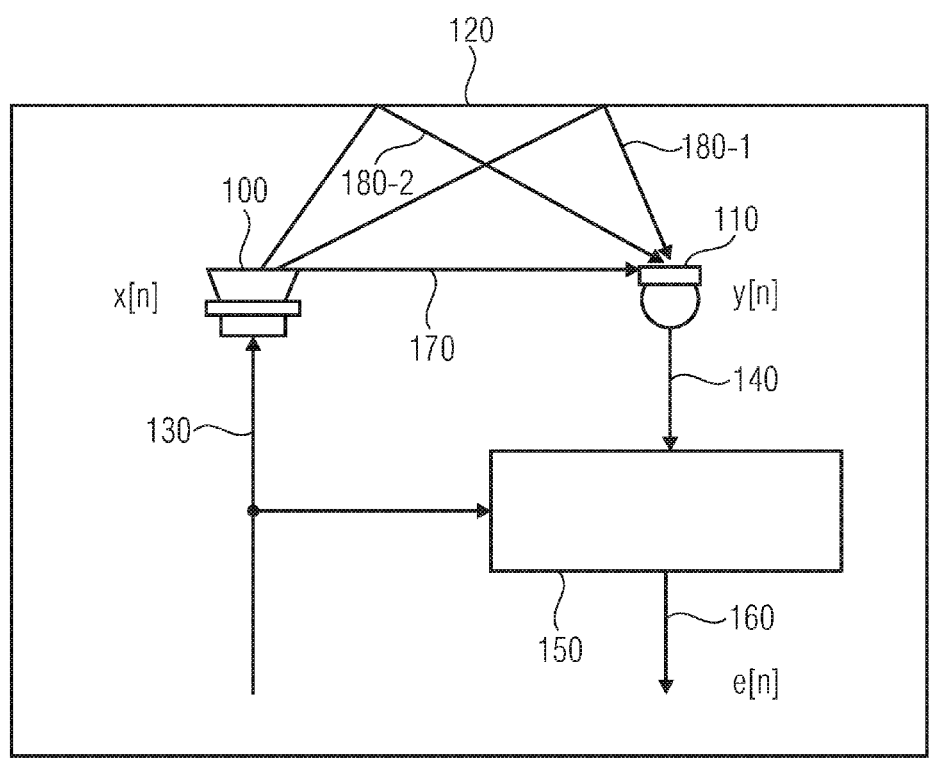
FIG. 1 shows a general setup of an acoustic echo removal problem.

In the present description identical reference numerals designate means, units, and objects which are identical in action, function, structure or similar in action, function or structure. This allows a shorter and more concise presentation of the embodiments of the present invention, since description passages may be transferred from one embodiment to another, unless this is explicitly ruled out.

In addition, in the present description, summarizing reference numerals shall be used for means, structures and objects which occur more than once within one figure or embodiment. For example, the two indirect paths 180-1, 180-2 which are shown in FIG. 1 have indeed been given different reference numerals in FIG. 1, but if the indirect paths are designated per se, or if general features of same are described, only the summarizing reference numeral 180 shall be used in the present description. This, too, serves to improve understanding and the conciseness of the present description.

Before describing, with reference to FIGS. 2 to 12, various embodiments of the teachings disclosed herein which enable acoustic echo suppression while using a separation of stationary and non-stationary signal components, a general setup of an acoustic echo removal problem will initially be illustrated with reference to FIG. 1.

In a full-duplex-suitable hands-free telecommunication system, echo control is typically necessitated for suppressing the coupling between the loudspeaker and the microphone.

FIG. 1 shows a loudspeaker 100, which may be provided, along with a microphone 110, in an acoustic environment 120, which may be a room, for example. Similarly, the acoustic environment 120 may also be the interior of a vehicle.

In this context, a loudspeaker signal 130, which in FIG. 1 is also referred to as x[n] with an integer time index n, is made available to the loudspeaker 100. The microphone 110 picks up the noises, sounds and tones stemming from the acoustic environment 120, and generates a microphone signal 140, which is also referred to as y[n] in FIG. 1. Both the loudspeaker signal 130 and microphone signal 140 are provided as input signals to an echo removal process unit 150, which provides, at an output, an echo-suppressed signal 160 of the microphone signal 140, which is also referred to as e[n] in FIG. 1.

FIG. 1 thus basically illustrates the acoustic echo problem as may arise in bi-directional communication systems. The signal of the far end of the telecommunication system which is output by the loudspeaker reaches the microphone on a direct path 170 and via reflected paths 180-1, 180-2, which are also referred to as indirect paths. For this reason, the microphone 110 does not only pick up the voice at the local, near end, but also registers the echo which is then fed back to the user at the far end.

In other words, the loudspeaker signal x[n] is fed back into the microphone signal y[n]. An echo removal process, performed in the echo removal process unit 150, ideally removes this echo while it allows the voice of the local, near end of the telecommunication system to pass through.

A conventional method of coping with this echo is to place an acoustic echo canceller (AEC) in parallel with the propagation path of the echo signal, as is described in Reference [1]. In such an acoustic echo canceller, a digital replica of the echo signal is estimated and is subsequently subtracted from the measured or observed microphone signal. Standard approaches for cancelling acoustic echoes rely on the assumption that the echo path can be modeled by a linear FIR filter (FIR=finite impulse response), and implement acoustic echo cancellers accordingly, as is also described in Reference [1]. Since the echo path is typically unknown and, moreover, may change during the operation time, the linear filter of such an acoustic echo canceller is typically realized adaptively. To be able to model typical echo paths, use is made of FIR filters of lengths of typically some hundreds of milliseconds which—in relation to the respective sampling rate—also implies a high level of computational complexity.

In practice, the achievable echo attenuations for these conventional approaches are frequently not sufficient for various reasons. The various reasons include, for example, long reverberation times (echo tail effect), which result in undermodeling of the echo path, nonlinear echo components caused, e.g., by vibration effects or the nonlinear behavior of particularly low-cost audio hardware, and convergence problems in case of a high temporal rate of change with regard to the echo paths, as is described in Reference [2]. Therefore, acoustic echo cancellers are combined with nonlinear post-processors to remove residual echoes and echo components which the echo canceller could not eliminate, as is described in Reference [3]. Commonly, the suppression of residual echoes is performed in a frequency-selective way, as is described in Reference [4]. Indeed, virtually all acoustic echo cancellers use such post-processors because they fail too often to sufficiently reduce the echo such that it becomes inaudible.

Recently, a number of acoustic echo suppressors for the subband domain have been proposed in References [5, 6] which bear similarities to the above-mentioned nonlinear post-processors, but have no need for an acoustic echo canceller and for estimating the echo path impulse response. These systems are claimed to be of low computational complexity and to be robust while achieving a high degree of duplexity.

The echo suppressor scheme proposed in Reference [6] applies a short-time Fourier transform (STFT) to compute spectra of the loudspeaker and microphone signals. A delay value d between the short-time Fourier transformed ones of the two signals is applied to the corresponding loudspeaker signal, said delay value being chosen such that most of the effect of the echo path impulse response is taken into account.

Then a real-valued echo estimation function, which mimics the effect of the initial echo path, is estimated. To obtain an estimated echo magnitude spectrum, the estimated delay value and the echo estimation function are applied to the loudspeaker spectra. Using the estimate of the echo magnitude spectrum, a real-valued echo suppression filter is computed and applied to the microphone signal spectrum to suppress the echo.

The above-mentioned acoustic echo suppression systems consider the effect of late reverberation in the room when estimating the echo power spectrum, i.e. the effect of late reverberation is considered in the same manner as the effect of the early reflections in the echo path, although the late reverberations typically have different properties compared to the early reflections. To cope with the echo components resulting from late reverberation, a temporal smoothing of the echo removal filter is sometimes used. In practice this approach might increase undesired near-end distortion.

Furthermore, the late reverberations typically tend to be more random than the early reflections which may be due to a superposition of different propagation and reflection paths between the loudspeaker and the microphone in the acoustic environment 120.

The far-end signal x[n] emitted by the loudspeaker travels to the microphone both directly and via reflected paths. The microphone signal y[n] comprises the local near-end speech and noise w[n] and the echo which is thus fed back to the user on the far-end, $$y[n]=h[n]*x[n]+w[n], \quad (1)$$

where h is the room impulse response and * denotes convolution.

Figure 2:
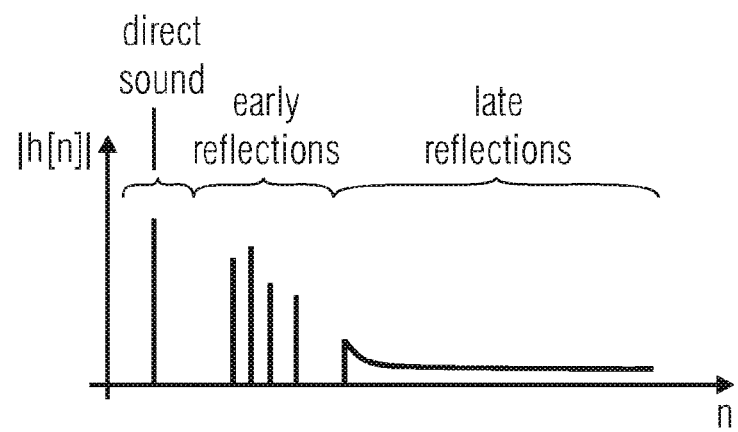
FIG. 2 shows the general structure of a typical room impulse response.

As illustrated in FIG. 2, the room impulse response h can be decomposed into a direct sound, an early reflection (or several early reflections) and late reverberation. The latter is also referred to as echo tail. In previously proposed methods described in reference [6], only a global delay parameter d and an echo estimation function g are used to model the echo path in order to capture direct sound and early reflections. Late reflections are not modeled in the previously proposed methods, but considered by time-smoothing of the echo suppression filter. The microphone signal y[n] can thus be expressed by:

$$y[n]=g[n]x*[n-d]+w[n]. \quad (2)$$

The global delay parameter d can be explained by the fact that the minimum distance path of the loudspeaker signal to the microphone is given by the distance from the loudspeaker to the microphone, i.e. the loudspeaker signal needs to travel at least the distance from the loudspeaker to the microphone via the direct path. The early reflections are typically relatively similar to the original loudspeaker signal and the direct sound because the early reflections correspond to a number of primary reflection paths 180 (FIG. 1), this number typically being relatively small in a normal acoustic environment. The echo tail is caused by various effects such as sound scattering, resonance effects, and multipoint reflections, to name a few. At the microphone 110 a superposition of the loudspeaker signal x[n] having traveled a plurality of different paths in the acoustic environment 120 occurs. Due to the increasing number of possible propagation paths between the loudspeaker 100 and the microphone 110 with increasing propagation delay (that is, there is only a single direct path 170 and only a limited number of single-reflection paths 180, but a vast number of multi-reflection paths) the superimposed loudspeaker signals arriving at the microphone 110 may be considered as substantially random past a given time interval subsequent to the arrival of the direct sound. Damping effects of the acoustic environment 120 cause a decay in the late reverberation which may be modeled as an exponential decay.

Figure 3:
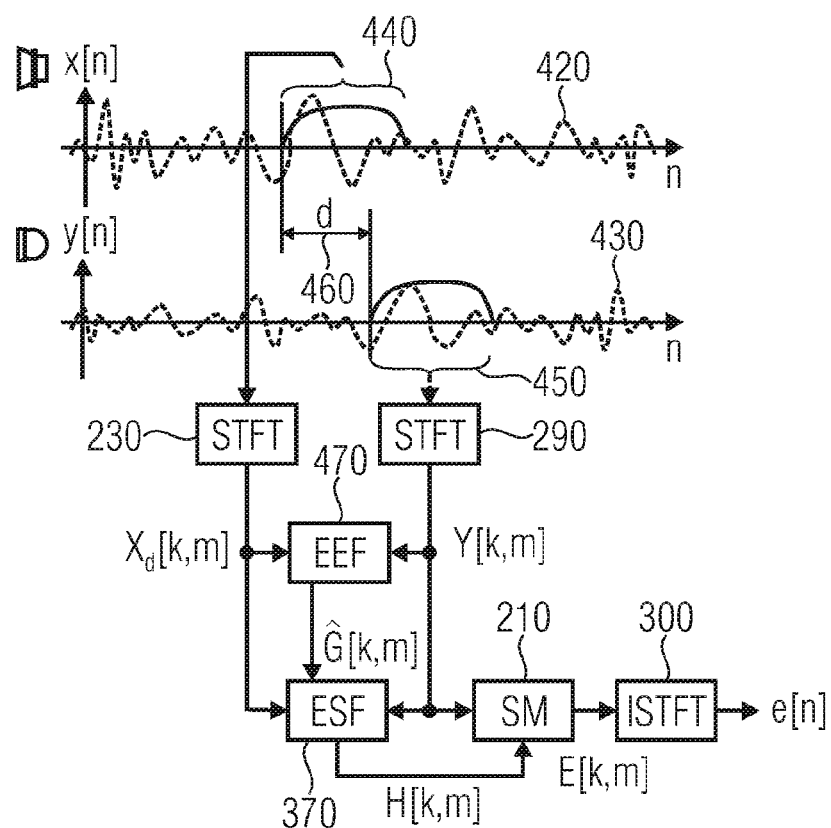
FIG. 3 shows a basic block diagram of a short-time spectral domain acoustic echo suppressor.

As illustrated in FIG. 3, short time discrete Fourier transform (STFT) spectra are computed from the loudspeaker signal 420 and the microphone signal 430. The time intervals considered for the STFT transformation of the loudspeaker signal 420 and the microphone signal 430 are indicated by the reference signs 440 and 450, respectively, in FIG. 3. A delay d (reference sign 460) is introduced between the loudspeaker signal 420 and the microphone signal 430 because the acoustic signal emitted by the loudspeaker 100 necessitates a certain minimum time to propagate to the microphone 110. The delay d between the STFT windows applied to the loudspeaker signal 420 is chosen such that most of the energy of the echo path's impulse response is captured. The STFT domain representation of equation (2) is given by $$Y[k, m]=G[k, m]X_d[k, m]+W[k, m], \quad (3)$$

where k is the block time index and m denotes the frequency index. $X_d[k,m]$ is the STFT domain correspondence of the delayed loudspeaker signal x[n−d]. From equation (3) it also becomes clear that the late reverberation of the acoustic echo path is not captured in the model, as the time span that is covered by G[k,m] corresponds to the block length of one STFT block. Typically, these blocks have a length of 10 to 30 ms, which is by far less than common reverberation times of up to several hundreds of ms.

The actual acoustic echo suppression is performed by modifying the magnitude of the STFT of the microphone signal Y[k, m], while keeping its phase unchanged. This can be expressed by $$E[k, m]=H[k, m]Y[k, m], \quad (4)$$

where the echo suppression filter (ESF) 370 outputs a real valued, positive gain factor H[k,m]. In the time and frequency discrete implementation (as it is the case with a short time Fourier transformation), the value H[k,m] is typically one element of a matrix H, which is valid for the STFT block currently considered.

The real valued, positive gain factor(s) H[k,m] is provided to the actual adaptive filter 210 (SM: spectral modification) which provides the echo suppressed microphone signal E[k,m] in the STFT domain. The transformation back from the STFT domain to the time domain is performed by an inverse short time Fourier transformation (ISTFT) 300 to output the signal e[n].

Going back in the block diagram of FIG. 3, the echo suppression filter 370 uses an estimate of the acoustic environment's transfer function G[k,m], the estimate being designated by Ĝ[k,m]. The optimum values for the echo suppression filter 370 and its output H[k,m] can be derived by minimizing the contribution of the echo components to the output signal E[k,m] in the mean square error (MSE) sense. An estimate of the echo power spectrum is obtained by applying the estimated delay and the estimated echo estimation function (EEF) 470 to the loudspeaker signal power spectrum, e.g., $$|\hat{Y}[k, m]|^2 = |\hat{G}[k, m]|^2 |X_d[k, m]|^2. \quad (5)$$

Note that in practice the echo power transfer function $|G[k,m]|^2$ is not known and has to be replaced by its estimate, namely $|\hat{G}[k,m]|^2$.

The estimation of the echo transfer function G[k,m] or of its power transfer function within the echo estimation function 470 can, e.g., be performed as described in reference [11]. The estimate can be estimated from the correlation of the power spectra of the microphone and loudspeaker signals 420, 430, respectively.

$$|\hat{G}[k, m]|^2 = \frac{E\{|X_d[k, m]|^2 |Y[k, m]|^2\}}{E\{|X_d[k, m]|^2 |X_d[k, m]|^2\}}. \quad (6)$$

Note that in practice the mathematical expectation $E\{\ \}$, used here, may be replaced by corresponding short time averages. To give an example, we consider $$\Phi_{AB}[k, m] = E\{A[k, m]B[k, m]\}. \quad (7)$$

The short time average $\Phi_{AB}[k, m]$ corresponding to $\Phi_{AB}[k, m]$ can, e.g., be obtained by recursive smoothing according to $$\hat{\Phi}_{AB}[k, m] = (1-\alpha_{avg})\hat{\Phi}_{AB}[k-1, m] + \alpha_{avg}A[k, m]B[k, m]. \quad (8)$$

The factor $\alpha_{avg}$ determines the degree of smoothing over time and it can be adjusted to any given requirements.

A practical approach for the computation of the echo suppression filter 370 has, e.g., been proposed in reference [6]:

$$H[k, m] = \frac{|Y[k, m]|^2 - \beta|\hat{Y}[k, m]|^2}{|Y[k, m]|^2}, \quad (9)$$

where β represents a design parameter to control the amount of echo to be suppressed, as described in reference [12].

The following paragraph summarizes the structure of an apparatus 200 according to a relatively elaborate embodiment of the teachings disclosed herein. This embodiment possibly comprises more components and/or features than necessitated for a basic implementation of the disclosed teachings.

An echo decay model provides echo decay parameters to an echo estimation function determination means. The echo estimation function determination means determines an echo estimation function which takes into account the echo decay parameters. The echo estimation function is then applied to the loudspeaker signal in order to determine an estimate of the echo as it occurs in the actual acoustic environment. The estimate of the echo may then be used by an echo suppression filter determination means (also referred to as computing means 270 in this description). The echo suppression filter determination means is implemented to determine a filter which, upon application to the microphone signal, suppresses the echo component in the microphone signal that is due to the loudspeaker signal. To this end, the filter coefficients that constitute the echo suppression filter are supplied to a corresponding filter structure which receives the microphone signal as an input and provides an echo suppressed signal at an output.

Figure 4:
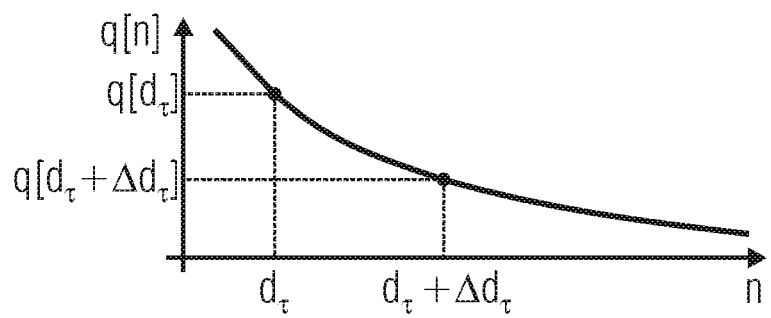
FIG. 4 shows an exponential decay of reverberation.

In FIG. 4, an envelope q[n] of the late reverberation part of a room impulse response is shown if the exponential decaying model is assumed:

$$q[n] = e^{-\frac{n}{\tau}}. \quad (10)$$

Considering the two time samples $d_\tau$ and $d_\tau + \Delta d_\tau$, and the corresponding values $q[d_\tau]$ and $q[d_\tau + \Delta d_\tau]$, respectively, the time constant τ can be estimated based on the ratio $$\Delta q = \frac{q[d_\tau + \Delta d_\tau]}{q[d_\tau]}, \quad (11)$$

which can be written as $$\Delta q = e^{-\frac{\Delta d_\tau}{\tau}}. \quad (12)$$

Solving for the time constant τ yields $$\tau = -\frac{\Delta d_\tau}{\ln \Delta q}. \quad (13)$$

In case the envelope value q is represented in the time-frequency domain following e.g. a short-time Fourier transformation (STFT), each frequency band may exhibit an individual time constant $\tau_m$ called the block time constant. The computation of the block time constant $\tau_m$ as used in the STFT domain model according to equation (29) explained below can be performed in an analog manner.

$$Q[k, m] = e^{-\frac{k}{F_s \tau_m}}. \quad (14)$$

Considering the two time samples $d_\tau$ and $d_\tau + \Delta d_\tau$, and the corresponding envelope values $Q[d_\tau, m]$ and $Q[d_\tau + \Delta d_\tau, m]$, respectively, the time constant $\tau_m$ can be estimated based on the ratio $$\Delta Q[m] = \frac{Q[d_\tau + \Delta d_\tau, m]}{Q[d_\tau, m]}, \quad (15)$$

$$\Delta Q[m] = e^{-\frac{\Delta d_\tau}{F_s \tau_m}}, \quad (16)$$

$$\tau_m = -\frac{\Delta d_\tau}{F_s \ln(\Delta Q[m])}. \quad (17)$$

In the following section a method is presented to determine ΔQ[m] for a given value of $\Delta d_\tau$. The method is based on a similar approach as that used for determining the echo estimation function in equation (6):

$$|\hat{Q}_{d_\tau}[k,m]|^2 = \frac{E\{X_{d_\tau}[k,m]Y[k,m]\}}{E\{X_{d_\tau}[k,m]X_{d_\tau}[k,m]\}}, \quad (18)$$

$$|\hat{Q}_{d_\tau+\Delta d_\tau}[k,m]|^2 = \frac{E\{X_{d_\tau+\Delta d_\tau}[k,m]Y[k,m]\}}{E\{X_{d_\tau+\Delta d_\tau}[k,m]X_{d_\tau+\Delta d_\tau}[k,m]\}}. \quad (19)$$

From this we compute $$\Delta Q[k,m] = \sqrt{\frac{|\hat{Q}_{d_\tau+\Delta d_\tau}[k,m]|^2}{|\hat{Q}_{d_\tau}[k,m]|^2}}. \quad (20)$$

The reverberation time $RT_{60}$ for the exponentially decaying model can be computed as the time n, where q[n] in equation (10) has decreased by −60 dB:

Solving for the desired $e^{-\frac{RT_{60}}{\tau}} = 10^{-6}$ time constant $\tau$ yields (21)

$$\tau = \frac{RT_{60}}{\ln(10^6)}. \quad (22)$$

Using this time constant τ, a suitable proportionality factor α can be determined. The computation of a corresponding STFT domain proportionality factor $\alpha_m$ from the reverberation time $RT_{60}$ can be performed in an analog manner.

Instead of measuring the reverberation time $RT_{60}$ as described above by observing the two time samples $d_\tau$ and $d_\tau+\Delta d_\tau$, and the corresponding envelope values Q[$d_\tau$,m] and Q[$d_\tau+\Delta d_\tau$, m], respectively, it is also possible to provide a-priori values for the reverberation time $RT_{60}$. The a-priori values may be provided as a function of the type of the acoustic environment 120, for example, the interior of a car, an office, a conference room, an auditorium, or a concert hall. The reverberation time of a concert hall (2 seconds to 4 seconds) is typically two orders or magnitude longer than the reverberation time of the interior of a car (around 40 ms). Even without having measured the actual reverberation time $RT_{60}$ for a given acoustic environment, the a-priori values typically give a good approximation for the corresponding type of acoustic environment. The apparatus 200 for computing the filter coefficients may comprise a selection switch or the like by means of which a user may select e.g. a short reverberation time, a medium reverberation time, and a long reverberation time.

For each frequency band considered in the STFT domain model an individual time constant $\tau_m$ may be determined. The determination of a plurality of individual time constants $\tau_m$ for the various frequency bands reflects the fact that the reverberation times observed within the various frequency bands may differ from each other due to a frequency-dependent response of the acoustic environment 120. For example, long reverberation times for low to medium frequency bands may be observed in large rooms, while higher frequency tend to have shorter reverberation times. In the alternative, it is also possible to determine a single time constant τ as an average over all frequency bands.

Figure 5:
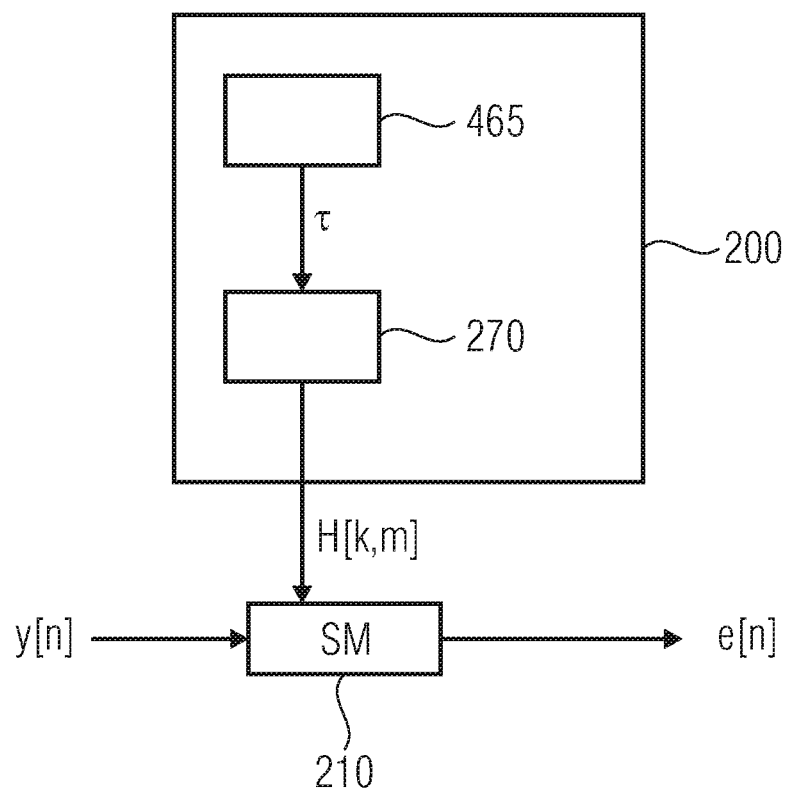
FIG. 5 shows a schematic block diagram of an apparatus in accordance with various embodiments of the teachings of this document.

FIG. 5 shows a first embodiment of an apparatus 200 for computing filter coefficients for an adaptive filter 210, said apparatus utilizing, just like the associated method, an echo decay modeling means 465 in order to improve echo suppression and, thus, to improve the achievable audio quality.

Embodiments of the present invention thus enable different kinds of handling the suppression of signals in accordance with their echo properties and features, which leads to a more effective echo suppression which is less prone to artifacts.

Figure 6:
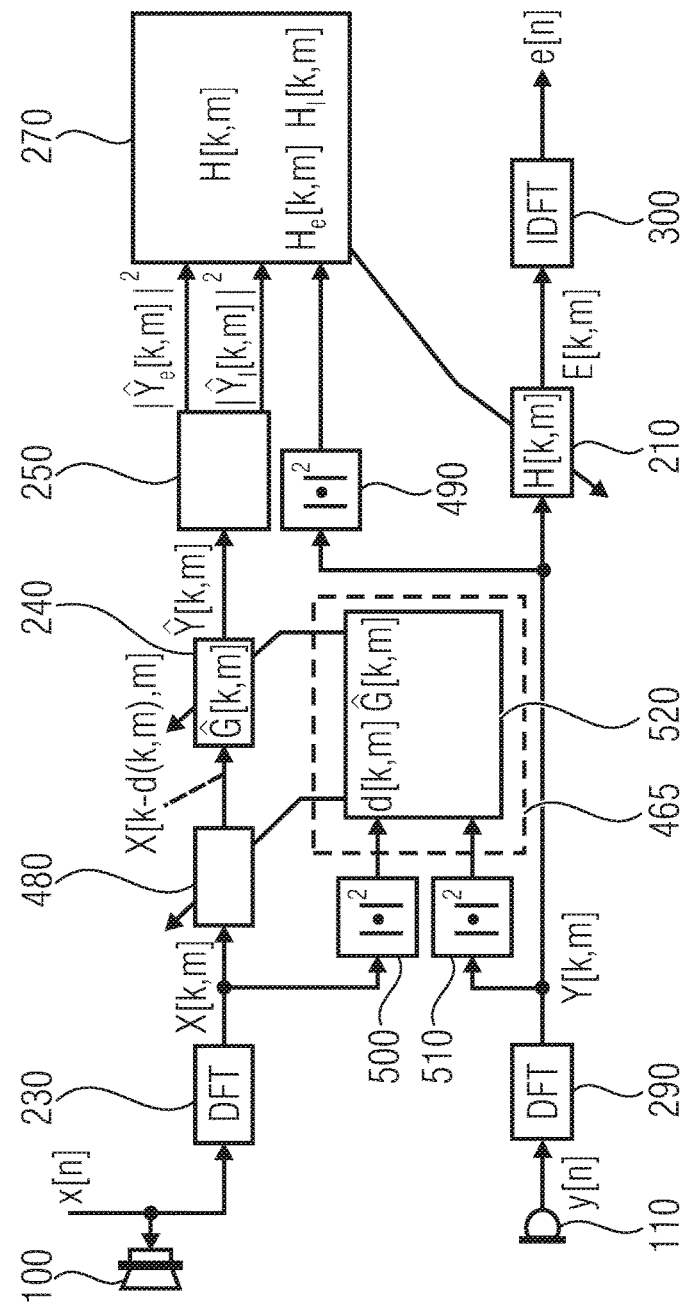
FIG. 6 shows a schematic block diagram of a further embodiment according to the teachings of this document.
Figure 7:
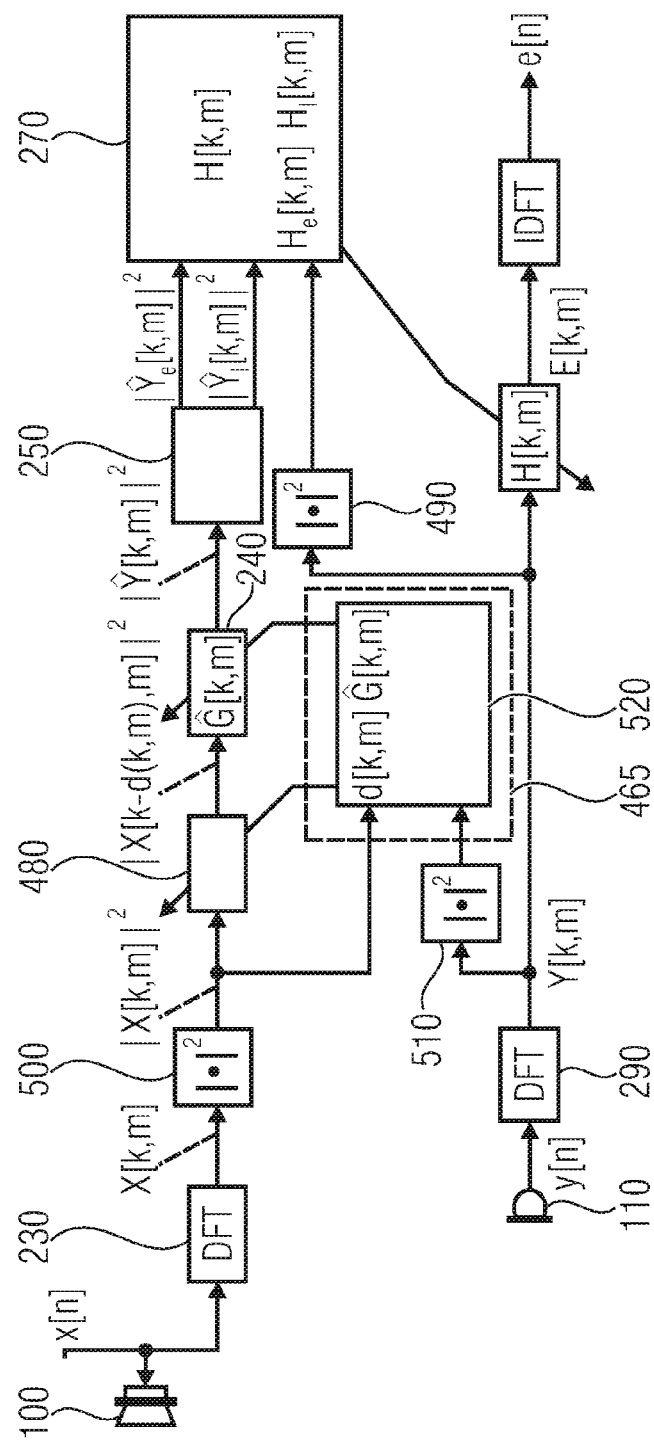
FIG. 7 shows a schematic block diagram of a further embodiment according to the teachings of this document.
Figure 8:
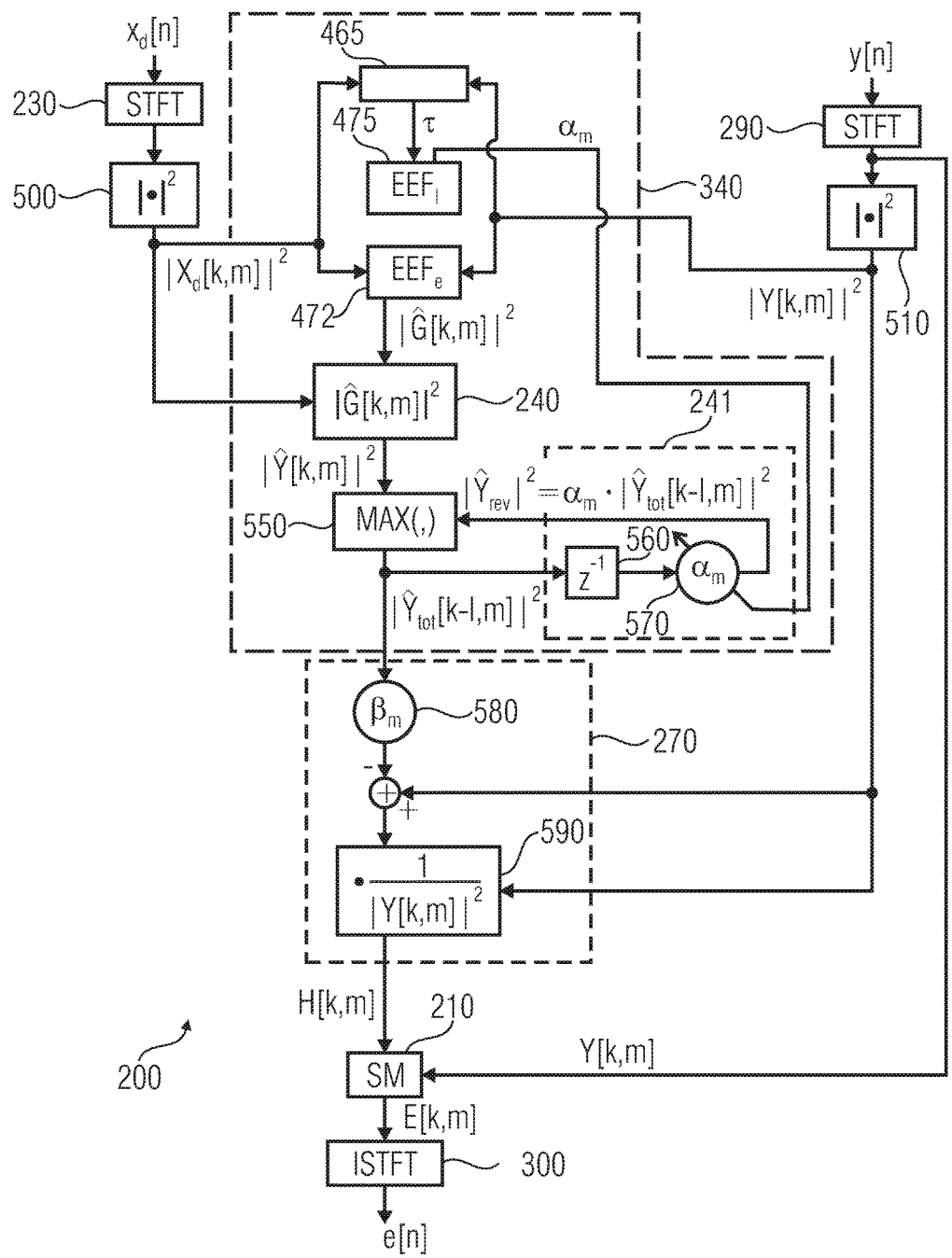
FIG. 8 shows a schematic block diagram of a further embodiment according to the teachings of this document.

As an introduction, a block diagram of the apparatus 200 in accordance with an embodiment of the present invention shall initially be explained, before further implementation details shall be explained, in connection with FIGS. 6 to 8, with regard to various embodiments of the present invention. In this context it is useful to point out that even if block diagrams of apparatuses in accordance with embodiments of the present invention are shown and described in the figures, said block diagrams may also be understood as flow charts of corresponding methods which depict the corresponding method steps while indicating the flow directions. In other words, the block diagrams depicted in connection with the present description may also be understood as corresponding flow charts which reflect the individual method steps of the individual means and units.

The apparatus 200 may be implemented, for example, in the echo removal process unit 150 shown in FIG. 1.

Before the mode of operation of the embodiment, shown in FIG. 5, of an apparatus 200 will be explained in more detail, it should also be mentioned that embodiments of the present invention may basically be implemented both within discrete circuits and within integrated circuits or other, more complex circuits. For example, embodiments of the present invention may also be implemented in data processing means, i.e. processors, integrated systems (SOC=system on chip), application-specific integrated circuits (ASIC) or other integrated circuits and special-purpose processors. In this context, it is quite possible for identical circuit parts of the respective data processing means to be employed in different means in a temporarily consecutive manner. For example, the same logical gate of an arithmetic logic unit (ALU) of a processor may be used, firstly, within the context of the functionality of the echo decay modeling means 465, and, secondly, within the context of the functionality of the computing means 270. Nevertheless, the two means differ not least with regard to further features, such as, in the above-mentioned case, with regard to different control commands, which co-define the different means, for example. A partial or complete overlap of circuit-engineering implementations of different means is therefore quite possible.

It is not least for this reason that in the present description means, components and structures which are coupled to one another are understood as means, components and structures which are indirectly or directly interconnected. If there is an implementation based on data processing means, for example, a coupling may be conducted by means of a storage location of a memory which has an intermediate result in the form of a signal latched therein.

In addition, however, embodiments of the present invention are basically not limited to digital implementations, even if mainly digital implementations will be described in the further course of the description. For example, an analog implementation or a mixed implementation comprising analog and digital components is feasible, in principle. In such a case, additional A/D or D/A converters (analog/digital and digital/analog converters) may be employed, for example, so as to possibly perform a transform of the signals of one type to the other.

FIG. 5 shows a schematic block diagram of an apparatus 200 in accordance with various embodiments of the teachings of this document. The apparatus 200 comprises an echo decay modeling means 465. The echo decay modeling means 465 provides, in the embodiment depicted in FIG. 5, an echo decay parameter τ to the computing means 270. The echo decay parameter τ models the reverberation time of the acoustic environment 120. The computing means 270 determines a filter function represented by filter coefficients H[k,m]. The filter coefficients H[k,m] are submitted to the adaptive filter 210 which applies the resulting filter to the microphone signal y[n]. The echo-suppressed signal e[n] is provided by the adaptive filter 210 as an output to signal processing means downstream of the adaptive filter 210. Although the microphone signal y[n], the echo-suppressed signal e[n], and the filter coefficients H[k,m] are represented in FIG. 5 as time discrete, digital signals, they may also be continuous time, analogue signals.

With regard to the mode of operation of the apparatus 200 as is depicted in FIG. 5, a loudspeaker signal is possibly transformed to a frequency-related domain by the time/frequency converter means which is optionally present (FIG. 6). The time/frequency converter means ensures, in the case of an implementation operating on data blocks (frames), a conversion to a spectral representation of the respective data block, so that the spectral representation provided at the output of the time/frequency converter means 230 (FIG. 6) corresponds to the data block in the time domain. Depending on the specific implementation, a Fourier transformation-based converter means, a subband-based converter means or a QMF-based converter means (QMF=quadrature mirror filter) may be used within the context of the time/frequency converter means. Irrespective of the precise mode of operation of the implemented time/frequency converter means, said converter means converts the signal (present in the time domain) provided at its input to a plurality of bandpass signals. Each bandpass signal has a characteristic frequency associated with it, which may be, for example, a center frequency, a lower cutoff frequency of the respective band or an upper cutoff frequency of the respective band, for example. Depending on the specific implementation, the individual bandpass signals may have more than one characteristic frequency or a further characteristic parameter associated with them.

Before individual components of the block diagram, shown in FIG. 5, of the apparatus 200 will be described in more detail in connection with FIGS. 6 to 8, it shall be noted at this point that processing of the loudspeaker signal or of the signal derived from the loudspeaker signal may be generally performed in the frequency-related domain such that an individual associated bandpass signal, a plurality of bandpass signals, a multitude of bandpass signals or all of the bandpass signals are processed accordingly.

It shall also be noted that the individual means and filters may operate while using energy-related values, for example, depending on the specific implementations. An energy-related value is a value which is formed as a power of a real base value with an even-numbered exponent, or is formed as a power of a magnitude of a value (absolute value) with any power. If, for example, short-time spectra are processed in the individual filters or in the individual means, said spectra may operate on energy-related values, for example, on energy values which are formed as magnitude squares of the associated spectral coefficients. Likewise, magnitude spectra, i.e. absolute values of the respective spectral coefficients, may be used with the exponent 1. In other words, values which are proportional to $|z|^m$, m being a positive number, for example a natural number, may be used, as energy-related values, starting from any value z, which is a real-valued or complex-valued value. In the case of a real-valued value z, values which are proportional to $z^{2m}$ may additionally be used as energy-related values.

With regard to signal modeling it is to be stated that an estimation of the echo contribution spectrum or of the echo power spectrum using an echo estimation function is typically not very accurate under practical conditions, since only a fraction of the true echo path length can be considered. To prevent that these inaccuracies result in residual echoes, echo removal filters are computed such that they aggressively suppress echoes, so that no residual echoes remain. This is achieved by overestimating the echo power spectrum and by performing time-smoothing, which favors small gain filter values.

The above-mentioned aggressive echo suppression filters frequently lead to impairment of a (stationary) near-end noise and near-end speech.

The approach proposed here mitigates this problem by using two different echo suppression models for early and late echo signals, respectively, as is also illustrated in FIG. 6.

FIG. 6 shows a block diagram of an apparatus 200 in accordance with an embodiment of the teachings disclosed herein, comprising a loudspeaker 100 and a microphone 110. The loudspeaker 100 has a loudspeaker signal x[n] made available to it. The DFT block 230 converts the loudspeaker signal x[n] to a DFT version X[k,m]. In addition, the computing means 270 also has the signal y[n] of the microphone 110 made available to it, again in the form of the corresponding DFT-domain representation Y[k,m] obtained from DFT block 290.

On the basis of the signals made available to them in each case, a suppression filter computing means 270 computes filter coefficients H[k,m]. The filter coefficients H[k,m] are provided to the adaptive filter 210.

In order to eventually obtain an echo-suppressed signal e[n] from the microphone signal y[n], the adaptive filter 210 is additionally coupled to the microphone so as to receive the microphone signal at an input. An output of the adaptive filter 210 is connected to the inverse discrete Fourier transformation (IDFT) 300 in order to provide a DFT representation of the echo-suppressed signal to the IDFT 300. The echo-suppressed signal e[n] is present at an output of the inverse discrete Fourier transformation block 300. Instead of using a discrete Fourier transformation, a short-time Fourier transformation (STFT) could be used in blocks 230 and 290. Likewise, an inverse short-time Fourier transformation (ISTFT) may be used instead of the inverse discrete Fourier transformation.

With regard to an echo power estimation, an estimate of the echo spectrum of the echo signal may be achieved by applying an echo estimation function $\hat{G}[k,m]$ to a temporally delayed version of the loudspeaker power spectrum in accordance with $$|\hat{Y}[k,m]|^2 = \hat{G}[k,m]^2 |X[k-d,m]|^2, \tag{23}$$

where $|\hat{Y}[k,m]|^2$ denotes an estimate of the power spectrum of the echo within the microphone signal.

Depending on the specific implementation of an embodiment of the present invention as is depicted, for example, in connection with FIGS. 6 to 8, the functionality described by equation (23) may be implemented within the echo suppression filter 270, for example.

With regard to the echo removal filter, the associated echo removal filter H[k,m] is computed and applied to the microphone signal in order to suppress the echo signal. This is effected in accordance with $$E[k,m] = H[k,m]Y[k,m]. \tag{24}$$

The filter components of the echo removal filter may be computed, for example, in accordance with $$H[k, m] = \left[\frac{\max\left(|Y[k, m]|^\gamma - \beta|\hat{Y}[k, m]|^\gamma, 10^{\frac{\gamma L}{20}}\right)}{|Y[k, m]|^\gamma}\right]^{\frac{1}{\gamma}}. \quad (25)$$

The design parameters β and γ may be used to control the intended performance for the echo removal filter. Depending on the specific implementation of embodiments of the present invention, said design parameters may be selected to be fixed, designed to be adaptable, programmable or modifiable in any other manner. A typical choice of the exponential parameter is γ=2, for example.

The so-called overestimation factor β is used for controlling the aggressiveness of the echo attenuation. For example, the aggressiveness of the corresponding echo removal filter may be increased by increasing the overestimation factor. Therefore, a typical choice of the echo removal filter H[k,m] with regard to the parameter β is β=2, in order to apply only moderate echo attenuation.

On the other hand, the echo removal filter may be designed in a highly aggressive manner in order to effectively attenuate disturbing speech components in the echo signal. The overestimation factor β may then be chosen as β=4, for example.

The limit value L determines the maximum echo attenuation allowed in decibel (dB). A typical value of an echo removal filter for substantially stationary noise is L=−10 dB or −15 dB, which expediently limits the attenuation for stationary echoes so as to reduce accidental artifacts. In the case of non-stationary speech at the far end, the attenuation should ensure complete attenuation of the corresponding echo components, which corresponds to a limit value for L of about −60 dB for non-stationary component signals.

The functionality as is designated by equation (25) may be implemented and realized, in the embodiments described in FIGS. 5 to 8, in the context of the filter computing means 270.

In some embodiments of the present invention, the actual echo suppression is not performed directly by applying the echo removal filters, as is described in equation (25). Rather, the corresponding echo removal is performed on the basis of a corresponding time-smoothed version. Time-smoothing the echo removal filter(s) may be useful to prevent the occurrence of too sudden changes, which may be disturbing to the listener. As in the case of the above-described design parameters, the time smoothing parameters are typically manually tuned and optimized separately for the early reflections and late reverberation echo suppression, respectively. However, when employing the teachings disclosed herein such time-smoothing is typically not necessary anymore, or at least not to the extent implemented in previous echo suppression systems.

Such time smoothing functionality may be performed, for example, within the context of the filter computing means 270 themselves or in any means downstream from them. It is also possible to perform such a time smoothing directly within the context of the adaptive filter 210, if need be.

The following section gives an introduction and explanation of the basic concepts underlying a reverberation modeling and an estimation of the late echo reverberation echo which may be useful to understand the teachings disclosed herein. A method is proposed to take into account specific properties of the room acoustics to adjust the echo suppression strength such that no residual echoes remain due to late reverberant echo components. The so-called echo tail is caused by late reflections in the room. The level of the reflections can be estimated through the reverberation time $RT_{60}$, i.e. the time necessitated for reflections of a direct sound to decay by 60 dB below the level of the direct sound. A suitable approach to model the effect of reverberation on the level of the echo signal and the estimation of the reverberation time are now described.

Reverberation Modeling

It is reasonable to assume that the power of reverberant sound in a room decays in an approximately exponential fashion. For the late reverberation components, it is also reasonable to assume that the reflections arriving at the microphone are considered as random and statistically independent. Based on this assumption, the late reverberations of the room impulse response h, which is schematically plotted in FIG. 3, can be modeled as a white noise sequence b[n] weighted by an exponential decay function:

$$h_{rev}[n] = b[n]e^{-\frac{n}{\tau}}. \quad (26)$$

The time constant τ determines the level of the decay. In the following we are interested in the decay of the echo level after an impulse-like sound. Without loss of generality we assume that the impulse has been emitted at n=0. Then, it follows from (26) that the observed signal corresponding to the late reverberation corresponds to $$y[n] = y_0 b[n]e^{-\frac{n}{\tau}}. \quad (27)$$

As the coefficients b[k] represent a white noise sequence, the power of the reverberation components is given by $$E\{y^2[n]\} = y_0^2 \sigma_b^2 e^{-\frac{2n}{\tau}}, \quad (28)$$

where $\sigma_b^2$ denotes the variance of the noise model b[n]. The STFT version of (28) is obtained by applying an analogous model in the spectral domain:

$$E\{|Y[k, m]|^2\} = Y_0^2(m)\sigma_b^2 e^{-\frac{2k}{F_s \tau_m}}, \quad (29)$$

Analogously to τ in (27), $\tau_m$ denotes a block-time decay constant applicable for the m'th frequency band. $F_s$ denotes the block related sampling rate of the STFT, i.e.

$$F_s = \frac{f_s}{K_{STFT}}, \quad (30)$$

where $f_s$ is the sampling frequency and $K_{STFT}$ the STFT window hop size. The window hop size is also referred to as frame size, denoting the number of new time samples considered for the computation of a new STFT value.

The model for the echo components corresponding to late reverberation as proposed in this invention follows from (29). The late reverberation components of the echo power spectrum $|\hat{Y}[k,m]|^2$ are obtained by an instantaneous realization of (29):

$$|\hat{Y}_{rev}[k, m]|^2 = Y_0^2(m)\sigma_b^2 e^{-\frac{2k}{F_s \tau_m}}. \quad (31)$$

From (31) it immediately follows that the power of the reverberant echo components at block time instant k can be estimated from the corresponding estimate at the previous time instant k−1.

$$|\hat{Y}_{rev}[k, m]|^2 = |\hat{Y}_{rev}[k - 1, m]|^2 e^{-\frac{2}{F_s \tau_m}}. \quad (32)$$

Estimation of late reverberation echo

The above discussion leads us to the procedure for estimating the echo power spectrum considering the direct path and early reflections together with the late reverberation components: Let $|\hat{Y}_{rev}[k,m]|^2$ denote the estimate of the power spectrum of the late reverberant echo, and let $|\hat{Y}[k,m]|^2$ denote the estimate of the power spectrum of the direct path and early reflections. The overall echo power estimate is denoted with $|\hat{Y}_{tot}[k,m]|^2$. The estimate of the power spectrum of the direct path and early reflections is performed according to (5). For convenience, we repeat it here:

$$|\hat{Y}[k, m]|^2 = |\hat{G}[k, m]|^2 |X_d[k, m]|^2. \quad (33)$$

The late reverberation components are determined analogously to (32) by the recursive equation $$|\hat{Y}_{rev}[k, m]|^2 = \alpha_m |\hat{Y}_{tot}[k-1, m]|^2. \quad (34)$$

The proportionality factor $\alpha_m$ can, e.g., be chosen according to the exponential decay model $$\alpha_m = e^{-\frac{2}{F_s \tau_m}}. \quad (35)$$

The desired proportionality factor $\alpha_m$ can thus be obtained from equations (17) and (35).

Although the index m in $\alpha_m$ indicates that the proportionality factor is chosen differently for each frequency band, it can as well be equal for all frequency bands.

Note that in contrast to (32), the recursive computation of the reverberant echo for the proposed method (34) is based on the overall echo power estimate of the previous frame $|\hat{Y}_{tot}[k-1,m]|^2$. This is illustrated in FIG. 8 and explained in more detail in the corresponding part of the description.

The overall estimate of the echo power spectrum is determined from considering both, $|\hat{Y}_{rev}[k,m]|^2$ (estimate of the power spectrum of the late reverberant echo) and $|\hat{Y}[k,m]|^2$ (estimate of the power spectrum of the direct path and early reflections). A suitable approach is to use the maximum of both as an estimate of the overall echo power spectrum:

$$|\hat{Y}_{tot}[k, m]|^2 = \max\{|\hat{Y}[k, m]|^2, |\hat{Y}_{rev}[k, m]|^2\}. \quad (36)$$

Note that (36) together with (34) implies that after a direct echo component is considered to be dominant in the overall echo estimate, the recursive model for estimating the reverberant echo components is reset to the new direct echo components: the recursive estimate takes the previous overall echo power spectrum estimate into account, i.e., it is not bound to the previous estimate of the reverberant echo components.

The estimate of the echo power spectrum is then used to determine the echo suppression filter analogously to (9)

$$H[k, m] = \frac{|Y[k, m]|^2 - \beta |\hat{Y}_{tot}[k, m]|^2}{|Y[k, m]|^2}. \quad (37)$$

In order to differentiate between the situations when only far-end speech is output by the loudspeaker signal, two different parameters may be computed. This includes, initially, the so-called prediction gain, which corresponds to full-band averaging of coherence functions between the loudspeaker channel and the microphone channel. As a second parameter, use is made of the voice activity within the loudspeaker channel, which, for example, may be derived from a comparison of the temporal signal levels of the loudspeaker signal or from codec-specific parameters as are used, for example, specifically with codecs suitable for voice transmission. These codecs include, for example, LPC-based codecs or CELP-based codecs (CELP=code excited linear prediction, or code book excited linear prediction), the term codec being an artificial word created by combining the abbreviations of the English terms coder and decoder.

The prediction gain or echo prediction gain ω[k] describes the level of similarity between the microphone signal and the delayed loudspeaker signal. Computation of the prediction gain ω[k] is performed on the basis of a squared coherence function between the delayed power spectrum of the loudspeaker signal $|X_d[k, m]|^2$ and the power spectrum of the microphone signal $|Y[k, m]|^2$ in accordance with $$\Gamma_d[k, m] = \frac{(E\{|X_d[k, m]|^2 |Y[k, m]|^2\})^2}{E\{|X_d[k, m]|^2 |X_d[k, m]|^2\} E\{|Y[k, m]|^2 |Y[k, m]|^2\}}, \quad (38)$$

where $E\{\ldots\}$ designates the mathematical expectation value. Said mathematical expectation value may be obtained within the context of a short-time estimation of the coherence function $\Gamma_d[k, m]$ by computing or approximating the expectation value $E\{|X_d[k, m]|^2 |Y[k, m]|^2\}$ in accordance with $$E\{|X_d[k, m]|^2 |Y[k, m]|^2\} = \alpha |X_d[k, m]|^2 |Y[k, m]|^2 + (1-\alpha) E\{|X_d[k-1, m]|^2 |Y[k-1, m]|^2\}. \quad (39)$$

In the context of the prediction gain calculation the factor α determines the degree of smoothing of the estimation over time. This factor has a time constant connected to it, since equation (39) roughly corresponds to an exponential decay. The time constant $T_\alpha$ of the exponential decay in seconds is approximately $$T_\alpha \propto \frac{1}{\alpha f_s}, \quad (40)$$

where $f_s$ denotes the sampling frequency. In other words, the proportionality relation (40) illustrates how factors which are actually dimensionless (here α), relating to the sampling rate $f_s$, may be indicated as time constant (here $T_\alpha$).

The prediction gain ω[k] is then computed as the mean value of the coherence functions $\Gamma_d[k, m]$ over the frequencies which are indicated by the indices m=0, ..., M−1, in accordance with $$\omega[k] = \frac{1}{M} \sum_{m=0}^{M-1} \Gamma_d[k, m], \quad (41)$$

where M denotes the very number of frequency bands.

An echo gain factor close to 1 signifies that the microphone signal can be (almost) fully predicted on the basis of the delayed loudspeaker signal. Therefore, the likelihood that the microphone signal contains only far-end speech tends toward 1. The control parameter β can then be controlled in relation to the prediction gain ω. Whenever the prediction gain is high, only far-end speech is present, and the echo attenuation should be sufficiently aggressive to remove all (echo) signals. Thus, the noise is removed with the lowest limit value L in decibel (dB) in that the control parameter β=0 is chosen. Whenever the prediction gain is low, both near-end and far-end speech may be present, so that the echo suppression should be less aggressive so as not to introduce artifacts. In this case, noise is processed and is removed with the limit value L in decibel (dB).

In this case it should be noted, however, that the prediction gain could be high if the loudspeaker signal contains only noise which is picked up by the microphone without the presence of speech. To prevent that the value of the control parameter β is chosen to be too large in this case, which would lead to excessive suppression, a second control parameter is used, namely the voice activity within the loudspeaker channel. Therefore, the above-described rules for computing the control parameter β as a function of the prediction gain ω actually apply only when speech is active within the loudspeaker channel.

In the embodiment depicted in FIG. 6, this functionality, which is described by equations (38) to (41), may be performed by the computing means 270.

Recall that the apparatus 200 illustrated in FIG. 6 includes a loudspeaker 100 or a terminal for a loudspeaker 100 or an input for a corresponding loudspeaker signal x[n]. Said loudspeaker signal x[n] is transformed to a spectral representation X[k,m] of the loudspeaker signal within the context of a time/frequency converter means 230 referred to as DFT (discrete Fourier transform). Said loudspeaker signal is provided to a delay means 480, which generates a delayed version of same X[k−d(k,m), m], d(k,m) being the corresponding delay value.

The signal delayed by the delay means 480 is then provided to a first echo estimation function 240, which generates an echo estimation signal Ŷ[k, m] on the basis of filter coefficients Ĝ[k,m]. Said echo estimation signal Ŷ[k, m] is provided to a separation means 250, which generates, on the basis of the spectral coefficients of this estimated echo signal, early and late power spectra of this signal as (derived) component signals of the loudspeaker signal. Thus, the extraction means 250 outputs the signals |Ŷ_e[k,m]|² (estimated power spectrum of early echo components) and |Ŷ_l[k,m]|² (estimated power spectrum of late echo components) to a computing means 270. As an alternative to the embodiment shown in FIG. 6, the echo estimation function 240 could output the estimated early echo components |Ŷ_e[k,m]|² and the estimated late echo components |Ŷ_l[k,m]|² directly, in which case the separation means 250 would not be needed.

The microphone signal y[n] of a microphone 110 is also provided to a time/frequency converter means 290 configured as a DFT, which generates a spectral representation Y[k,m] of the time signal y[n] from same. This signal is supplied via an energy value computing means 490, which, on the basis of the spectral components of the microphone signal, determines a power spectrum of said spectral components by squaring the (absolute) magnitude of the individual values. The power spectrum thus obtained is also provided to the computing means 270, which together with the above-described power spectra computes the two echo removal filters H_e[k,m] and H_l[k,m], i.e., the filter coefficients of the actual adaptive filter H[k,m] and forwards them to the adaptive filter 210. The actual adaptive filter H[k,m] may be determined on the basis of the two echo removal filters H_e[k,m] and H_l[k,m] for example by taking the minimum of the H_e[k,m] and H_l[k,m]. The two echo removal filter H_e[k,m] and H_l[k,m] may be determined in an analogue manner as described above with respect to equation (37):

$$H_e[k, m] = \frac{|Y[k, m]|^2 - \beta |\hat{Y}_e[k, m]|^2}{|Y[k, m]|^2} \quad (42)$$

and $$H_l[k, m] = \frac{|Y[k, m]|^2 - \beta |\hat{Y}_l[k, m]|^2}{|Y[k, m]|^2}. \quad (43)$$

As mentioned above, the actual adaptive filter H[k,m] may then be determined as the minimum of the two echo removal filters H_e[k,m] and H_l[k,m]:

$$H[k,m]=\min(H_e[k,m],H_l[k,m]) \quad (44)$$

The adaptive filter 210 is also coupled to the output of the time/frequency converter means 290 and thus also receives the spectral components Y[k,m] of the microphone signal y[n], from which it generates the echo-suppressed signal in the frequency domain or frequency-related domain E[k,m], while taking into account the filter coefficients H[k,m]. This echo-suppressed signal is then provided to the frequency/time converter means 300 configured as an IDFT (inverse DFT), which eventually converts this signal back to the time domain, yielding the signal e[n].

For determining the delay value d(k,m) for the delay means 480, and for determining the echo estimation coefficients for the echo estimation function 240, both the spectral representations of the loudspeaker signal X[k,m] and the spectral representations of the microphone signal Y[k,m] are transmitted to corresponding energy computing means 500, 510 which are coupled to the outputs of the two time/frequency converter means 230, 290. The energy computing means 500 is coupled to the output of the time/frequency converter means 230, and the energy computing means 510 is coupled to the output of the frequency/time converter means 300.

Both energy value computing means 500, 510 each compute, by analogy with the energy computing means 490, power spectra by squaring the magnitudes of the respective spectral components and provide these values to a further computing means 520. The further computing means 520, or a part thereof, is a component of the echo decay modeling means 465. The further computing means 520 then determines, on the basis of the values made available to it, an estimate for the delay d(k,m) and values for the coefficients Ĝ[k,m] for the echo estimation function 240. The corresponding above-mentioned values are then transmitted to the delay means 480, on the one hand, and to the echo estimation function 240, on the other hand, with which the further computing means 520 is also coupled.

As can also be seen from the embodiment shown in FIG. 6, the separation of the respective component signals ($|\hat{Y}_e[k,m]|^2$ and $|\hat{Y}_l[k,m]|^2$) may thus be performed on the basis of an estimation of the echo signal spectrum $\hat{Y}[k, m]$, which is computed in accordance with $$\hat{Y}[k,m]=\hat{G}[k,m]X[k-d,m]. \quad (45)$$

This computation is conducted in the echo estimation function 240.

The definition of the two echo removal filters $H_e[k,m]$ and $H_l[k,m]$ in accordance with equation (25) remains unchanged. The same applies to the determination of the combined echo removal filter $H[k,m]$. Note that, depending on the embodiment, the combination of the two echo removal filters $H_e[k,m]$ and $H_l[k,m]$ may be implemented as a temporary selection of one of the two echo removal filters on the basis of currently observed echo conditions. In particular, the selection of the currently active echo removal filter may be based on an evaluation whether the early echo components or the late echo components currently are predominant. The selection of the echo removal filters ($H_e[k,m]$ or $H_l[k,m]$) may implemented indirectly by selecting either the estimated power spectrum of the early echo components $|\hat{Y}_e[k,m]|^2$ or the estimated power spectrum of the late echo components $|\hat{Y}_l[k,m]|^2$ as the quantity $\hat{Y}_{tot}[k, m]$ in equation (37) by which the filter coefficients $H[k,m]$ are calculated.

It should be noted at this point that the embodiment shown in FIG. 6 relates to the case where the estimated spectrum of the echo signal $\hat{Y}[k, m]$ is already available. Of course, the corresponding method is also applicable when only the estimated power spectrum of the estimated echo signal $|\hat{Y}[k, m]|^2$ in accordance with equation (23) is known. This situation will be described in more detail in connection with the embodiment shown in FIG. 7.

While FIG. 6 shows a block diagram of an acoustic echo attenuation approach, the block diagram depicted in FIG. 7 illustrates a similar approach. By contrast, however, the latter is based on an acoustic echo attenuation approach which functions on the basis of an estimated power spectrum of the echo signal $|\hat{Y}[k, m]|^2$.

Consequently, it is not only the modes of operation of the two embodiments shown in FIGS. 6 and 7 that are very similar, but also their structures, as the description which follows will show.

More specifically, the embodiment shown in FIG. 7 differs from that shown in FIG. 6 essentially in that the energy computing means 500 is no longer connected exclusively upstream from the further computing means 520 with regard to the loudspeaker signal $x[n]$ transferred to the frequency domain, but is rather connected directly to the output of the time/frequency converter means 230 again configured as a DFT. In this manner, not only the further computing means 520, but also the delay means 480, the echo estimation function 240 and the separation means 250 are no longer provided with the actual spectral components, but rather with the power spectra of same.

Apart from this, however, the two embodiments shown in FIGS. 6 and 7 differ only in that the respective computations possibly proceed marginally differently from one another within the individual components and means. For example, the corresponding computation of the energy-related values of the individual spectral components is no longer performed in the separation means 250, since it was already performed previously by the energy value computing means 500.

FIG. 8 shows a further embodiment of an apparatus or a method according to the teachings disclosed herein. The early echo function determination means 472 outputs an estimate $|\hat{G}[k,m]|^2$ of the power transfer function of the acoustic environment 120. The estimate $|\hat{G}[k,m]|^2$ may be determined by means of a correlation between the microphone signal and the loudspeaker signal. The late echo estimation function determination means 475 outputs an echo decay parameter $\alpha_m$. The estimate $|\hat{G}[k,m]|^2$ is provided to a function block 240, i.e. an echo estimation function. The function block 240 uses the power transfer function estimate $|\hat{G}[k,m]|^2$ of the system response of the acoustic environment 120 and the loudspeaker signal power spectrum $|X[k,m]|^2$ to determine an estimated microphone power spectrum $|\hat{Y}[k,m]|^2$ as the current system response of the acoustic environment 120 upon excitation by the loudspeaker signal. Typically the estimate $|\hat{Y}[k,m]|^2$ of the currently considered system response to the loudspeaker signal substantially covers the early reflections, only: The time horizon of the estimates $|\hat{G}[k,m]|^2$ and $|\hat{Y}[k,m]|^2$ is limited. The estimate $|\hat{Y}[k,m]|^2$ is provided as one of two inputs to a maximum selector 550. The other input to the maximum selector 550 is provided by a previous output of the maximum selector 550, possibly scaled by a factor $\alpha_m$, which represents the late reverberant echo component $|Y_{rev}[k,m]|^2 = \alpha_m \cdot |Y_{tot}[k-1,m]|^2$. The output of the maximum selector 550 is an overall estimate of the echo power spectrum $|Y_{tot}[k,m]|^2$ which is determined from considering both, $|\hat{Y}[k,m]|^2$ and $\alpha_m \cdot |Y_{tot}[k-1, m]|^2$. The second term $\alpha_m \cdot |Y_{tot}[k-1, m]|^2$ is computed from the output of the maximum selector 550 by means of a delay element 560 and a scalar factor 570 for the parameter $\alpha_m$. The arrangement of the delay element 560 and the scalar factor 570 represents the late echo estimation means 241 and provides a recursive computation of the reverberant echo based on an exponential model for the reverberant part of the overall echo as has been explained above. Using the maximum among the inputs to the maximum selector 550 represents the finding that the early reflections are typically dominant during a first time interval subsequent to an excitation of the acoustic environment 120. These early reflections, which may be computed using the estimated echo response transfer power spectrum $|\hat{G}[k,m]|^2$, are primarily the target of echo cancellation during this first time interval. Indeed, the early reflections typically are dominant during the first phase after the excitation so that other echo components (late reverberations) may be neglected. In the absence of further excitations to the acoustic environment 120, the early reflections will decrease in magnitude and eventually vanish completely over time. Another reason for the estimated early reflections vanishing from $|\hat{Y}[k,m]|^2$ is that the transfer function $|\hat{G}[k,m]|^2$ typically has a limited length, only. When the magnitude of the estimated early reflections has dropped to a certain volume, the other input (i.e., the input for $\hat{Y}_{rev}[k,m]$) to the maximum selector 550 may carry a signal having a larger magnitude than the power spectrum of the early estimated reflections $|\hat{Y}[k,m]|^2$. As mentioned above, the recursive model for estimating the reverberant echo components by means of the delay element 560 and the scalar factor 570 is reset to the new direct echo components $|\hat{Y}[k,m]|^2$, provided the new direct echo components have a larger magnitude than the reverberant echo components. In other words, the reverberant echo components are not bound to a previous estimate of the reverberant echo components.

The output of the maximum selector 550 $|Y_{tot}[k,m]|^2$ is then used to determine the echo suppression filter in a manner analog to equation (9). In particular, the estimate of the echo power spectrum $|Y_{tot}[k,m]|^2$ is multiplied with a scalar factor $\beta_m$ (reference sign 580) and then subtracted from the power spectrum of the microphone signal $|Y[k,m]|^2$. The action of the maximum selector 550 may be regarded as one possible implementation to combine the early echo component ($\hat{Y}[k,m]$) and the late echo component ($\hat{Y}_{rev}[k,m]$). An alternative implementation of the combining of the early and late components could consist in calculating a weighted average.

The resulting difference is then normalized to the power spectrum of the microphone signal as indicated by block 590. The scalar factor 580, the summation point and the normalizing block 590 together form the computing means 270 (or are at least a part thereof) which provides the filter coefficients for the adaptive filter 210 (H[k,m]).

The parameter $\alpha_m$ governing the rate of the exponential decay model used within the scalar factor 570 may be determined by a late echo estimation function determination means 475. The scalar factor 570 may then be adjusted according to a value for the parameter $\alpha_m$ determined by the late echo estimation function 475 on the basis of the loudspeaker signal power spectrum and the microphone signal power spectrum. The reverberation time estimation and its relation to the exponential decay parameter have already been explained above.

The late echo estimation function determination means 475 may, on an input side, receive for example the echo decay time constant $\tau$ (or other measurements, parameters, etc.) from the echo decay modeling means 465. The echo decay modeling means 465 may be connected to the energy value computing means 500, 510 and thus receive the power spectra of the microphone and loudspeaker signals. The echo decay modeling means 465 may for example determine a correlation between the power spectra of the microphone and loudspeaker signals to determine the echo decay parameters. In the alternative, it may be sufficient to observe only the microphone signal. The late echo estimation function 475 may be provided with optional inputs for the microphone and loudspeaker signals, as well (not shown in FIG. 8).

FIG. 8 shows as a dashed box an echo processing means 340 which comprises the echo decay modeling means 465, the echo estimation function determination means 472 and 475, the echo estimation function 240, the maximum selector 550, and the late echo estimation means 241. The echo processing means 340 provides an estimate of the echo produced by the acoustic environment 120 in response to a given loudspeaker signal. The estimate of the echo may either be calculated on the basis of the early echo function determination means 472 or on the basis of recursive modeling of reverberant echo components as implemented by the late echo estimation means 241.

In the embodiment shown in FIG. 8, the maximum selector 550 uses the power spectra of the estimated early echo component $|\hat{Y}[k,m]|^2$ and of the estimated late echo component $|\hat{Y}_{rev}[k,m]|^2$ as input values and consequently also produces a power spectrum of the total echo $|\hat{Y}_{tot}[k,m]|^2$ at its output. In the alternative, frequency spectra (i.e., $\hat{Y}[k,m]$, $\hat{Y}_{rev}[k,m]$, and $\hat{Y}_{tot}[k,m]$) may be used instead of the power spectra. The terms "early echo component" and "late echo component" used in the corresponding dependent claim(s) is intended to cover both, frequency spectra and power spectra.

Figure 9:
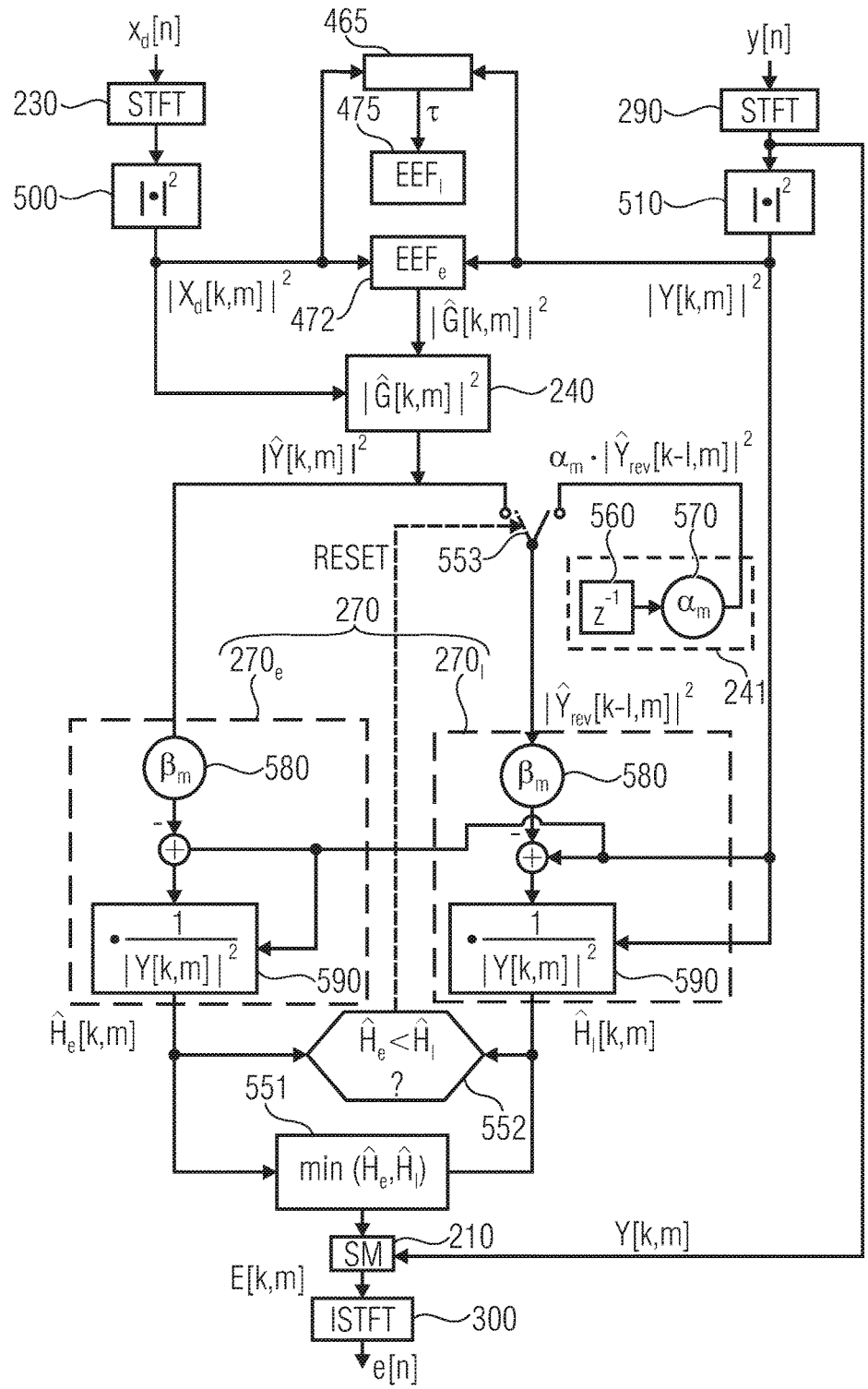
FIG. 9 shows a schematic block diagram of a further embodiment according to the teachings of this document.

FIG. 9 shows a schematic block diagram of an embodiment that is similar to the one shown in FIG. 8. Up to the echo estimation function 240, the block diagrams in FIGS. 8 and 9 are substantially identical. The echo estimation function 240 outputs the power spectrum of the estimated early echo component $|\hat{Y}[k,m]|^2$. This power spectrum of the early estimated echo component $|\hat{Y}[k,m]|^2$ is then distributed to a first computing means 270e and to a selector 553. The computing means 270$_e$ corresponds to the computing means 270 shown in FIG. 8. The difference between FIG. 8 and FIG. 9 is that in FIG. 9 the computing means 270$_e$ considers the power spectrum of the estimated early echo component $|\hat{Y}[k,m]|^2$ as an input. Thus, the output of the computing means 270$_e$ in FIG. 9 may be regarded as an echo removal filter $\hat{H}_e[k,m]$ for the early echo components. Besides the computing means 270$_e$, the power spectrum of the estimated early echo component $|\hat{Y}[k,m]|^2$ is also distributed to a first input of the selector 553. An output of the selector 553 is connected to a second computing means 270$_l$ and also to a late echo estimation means 241 similar to the one shown in FIG. 8. Accordingly, the late echo estimation means 241 comprises a delay element 560 and a scalar factor $\alpha_m$. An output of the late echo estimation means 241 is connected to a second input of the selector 553. When the selector 553 is in a configuration in which its second input is selected, a recursive calculation of the (late) echo components is performed as was explained above with reference to FIG. 8. When the selector 553 is in a configuration in which its first input is selected, the recursive calculation is reset or re-initialized to a current value of the power spectrum of the estimated early echo component $|\hat{Y}[k,m]|^2$.

The second computing means 270$_l$ receives the late reverberant echo component $|Y_{rev}[k,m]|^2$ and performs an analogue calculation as the first computing means 270$_e$, resulting in an estimate of an echo removal filter $\hat{H}_l[k,m]$ for the late echo components. The early echo removal filter $\hat{H}_e[k,m]$ and the late echo removal filter $\hat{H}_l[k,m]$ are both provided to a filter setting means 551 and to a comparator 552. The filter setting means 551 determines the filter coefficients H[k,m] of the adaptive filter 210 on the basis of the early echo removal filter $\hat{H}_e[k,m]$ and of the late echo removal filter $\hat{H}_l[k,m]$. In other words, the computing means 270 is further arranged to determine an early echo removal filter $\hat{H}_e[k,m]$ and a late echo removal filter $\hat{H}_l[k,m]$. The apparatus 200 further comprises a filter setting means 551 arranged to determine the filter coefficients H[k,m] of the adaptive filter 210 on the basis of a combination of filter coefficients of the early echo removal filter $\hat{H}_e[k,m]$ and of the late echo removal filter $\hat{H}_l[k,m]$. The combination of the early echo removal filter $\hat{H}_e[k,m]$ and the late echo removal filter $\hat{H}_l[k,m]$ may be a linear combination, a coefficient-wise selection of filter coefficients from the early echo removal filter $\hat{H}_e[k,m]$ and the late echo removal filter $\hat{H}_l[k,m]$, or another suitable combination of the two echo removal filters $\hat{H}_e[k,m]$ and $\hat{H}_l[k,m]$. In the embodiment depicted in FIG. 9, the filter setting means 551 is arranged as a minimum selector which selects the minimum among the early echo removal filter $\hat{H}_e[k,m]$ and the late echo removal filter $\hat{H}_l[k,m]$ which is then provided to the adaptive filter 210. In other words and as above, the computing means 270 (comprising the first computing means 270$_e$ and the second computing means 270$_l$) is further arranged to determine an early echo removal filter $\hat{H}_e[k,m]$ and a late echo removal filter $\hat{H}_l[k,m]$. The apparatus 200 further comprises a filter setting means 551 in the form of the minimum selector which is arranged to determine the filter coefficients H[k,m] of the adaptive filter 210 on the basis of a minimum selection among the early echo removal filter $\hat{H}_e[k,m]$ and the late echo removal filter $\hat{H}_l[k,m]$.

The comparator 552 generates a control signal for the selector 553 based on a comparison between the early echo removal filter $\hat{H}_e[k,m]$ and the late echo removal filter $\hat{H}_r[k,m]$. In the exemplary depicted embodiment, the control signal (dashed line marked "RESET" in FIG. 9) is high if the early echo removal filter $\hat{H}_e[k,m]$ is smaller than the late echo removal filter $\hat{H}_r[k,m]$, which causes the selector 553 to select its first input, i.e., the input which is connected to the echo estimation function 240. In this manner, the calculation of the reverberating echo components $|\hat{Y}_{rev}[k,m]|^2$ is reset or re-initialized to the current estimate of the early echo component $|\hat{Y}[k,m]|^2$.

The further processing is similar to the processing depicted and described with respect to the embodiment shown in FIG. 8.

Figure 10:
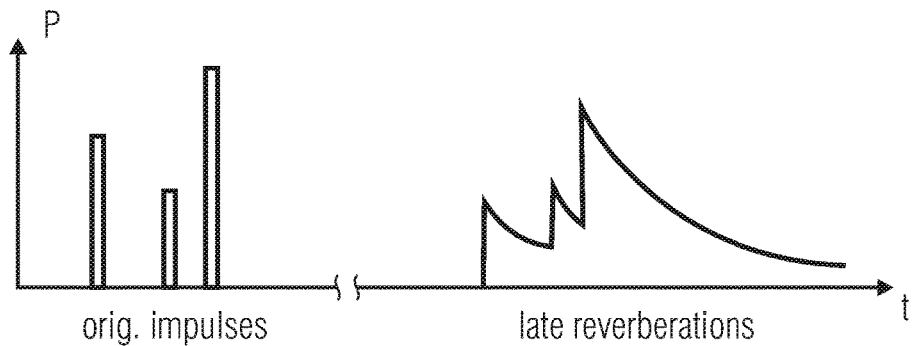
FIG. 10 shows a time diagram illustrating original impulses and corresponding late reverberations.

FIG. 10 illustrates how the late reverberations caused by several impulses within the acoustic environment 120 may overlap. Three impulses of different magnitude have been output to the acoustic environment 120 at different times. The early reflections are not illustrated in FIG. 10 for the sake of clarity. However, the late reverberations of the impulses are shown. In particular, it can be seen that an exponential decaying function corresponding to the late reverberation of the first impulse has not yet vanished when a second exponential decaying function corresponding to the second impulse is superimposed with the first exponentially decaying late reverberation. A similar effect occurs at the onset of the third exponentially decaying late reverberation corresponding to the third impulse. Furthermore, even though the original impulses and the direct sounds were relatively short in duration, the late reverberations extend over a longer time interval. Note that the late reverberations have been exaggerated in magnitude for the sake of illustration. Typically, the late reverberations are approximately one or several orders of magnitude smaller than the original impulses.

Figure 11:
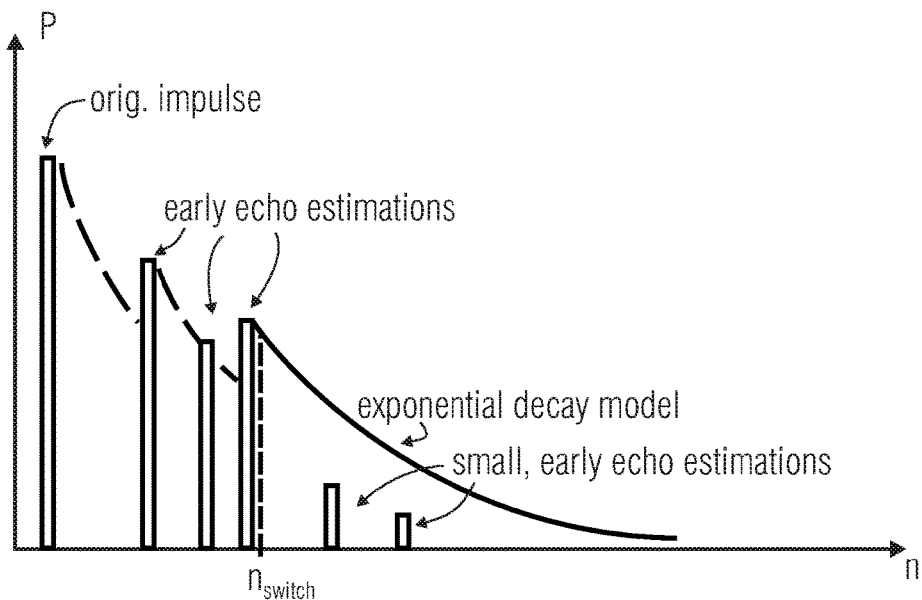
FIG. 11 shows a time diagram of echo estimation and reverberation modeling.

FIG. 11 illustrates how the modeling of the echo may switch over from an early echo model to an exponentially decaying model. As has been explained in the context of FIG. 8, a maximum may be determined among the early echo estimations and the exponential decay model. Up to an instant indicated by $n_{switch}$ in FIG. 11, the early echo estimations are larger in magnitude than an echo estimated by means of the exponential decay model. Therefore, the early echo estimations are used to model the echo response of the acoustic environment 120. Subsequent to the instant $n_{switch}$, the echo estimated by means of the exponential decay model is larger than any remaining echo estimations. Typically, the early echo estimation function(s) are not implemented to calculate echo estimations past a predetermined time horizon in order to keep the computational effort within reasonable bounds. This means that past this time horizon the exponential decay model is the only echo model providing a non-zero estimation for late echo components. Prior to the time horizon, both echo models may yield non-zero echo estimations and the one having a greater magnitude is selected.

In FIG. 11 it can be seen that the exponential decay model is reset to the magnitude of the early echo estimations, provided that the early echo estimations have a magnitude larger than the current magnitude of an echo estimated by means of the exponential decay model. In the alternative, it would be possible to gauge the exponential decay model on, e.g., the direct sound caused by an original impulse.

Figure 12:
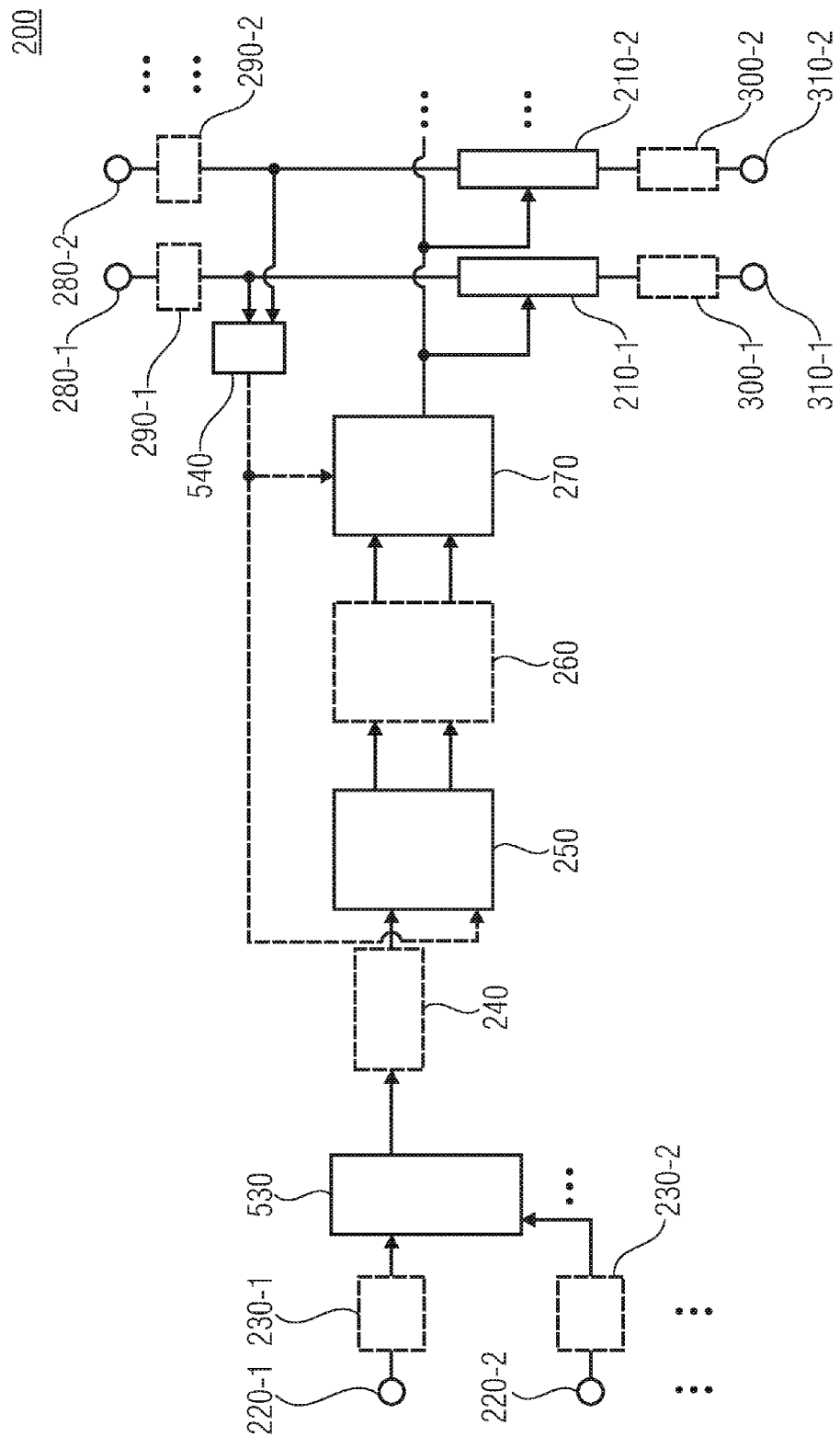
FIG. 12 shows a block diagram of an embodiment of the teachings disclosed in this document for a multichannel implementation.

FIG. 12 shows a further embodiment of the present invention, wherein, e.g., more than one loudspeaker signal or more than one microphone signal are provided to the respective apparatus 200. Put differently, the embodiment depicted in FIG. 12 is a multichannel apparatus.

While embodiments of the present invention were discussed and described above only for individual channels or the case of an individual channel, wherein only one loudspeaker signal and one microphone signal were available, embodiments of the present invention are not limited to the case of an individual channel, as will be explained below. Said embodiments may also be applied, by analogy, to multichannel-capable acoustic echo attenuation systems.

Since the embodiment, shown in FIG. 12, of an apparatus 200 is similar in structure to that shown in FIG. 6, reference shall be made below to the description in connection with FIGS. 6 to 8 as far as the mode of operation, connection and other aspects are concerned.

The multichannel variant, shown in FIG. 12, of the apparatus 200 comprises a plurality of inputs 220-1, 220-2, . . . where several loudspeaker signals may be coupled into the apparatus 200. Accordingly, the apparatus 200 also comprises a corresponding plurality of optional time/frequency converter means 230-1, 230-2, . . . , which possibly perform a translation or conversion of the corresponding loudspeaker signals from the time domain to a frequency-related domain.

The plurality of time/frequency converter means 230 are coupled to a corresponding number of inputs of a bundling means 530, which on the basis of the incoming loudspeaker signals forms a common, derived loudspeaker signal which then forwards same to the first echo estimation function 240 or to the separation means 250, depending on whether the optional first echo estimation function 240 is present. The separation means 250 is possibly coupled to an optional second echo estimation function 260 or directly to the computing means 270. Said means finally outputs the computed filter coefficients at an output of same.

The multichannel variant of the apparatus 200 in FIG. 12 further comprises a further bundling means 540, which is coupled, on the input side, to a corresponding number of inputs 280-1, 280-2, . . . for corresponding microphone signals via optional time/frequency converter means 290-1, 290-2, . . . . The further bundling means 540 determines, by analogy with the bundling means 530, on the basis of the microphone signals which are present within the time domain or in a frequency-related domain and are made available to it, a derived, effective or common microphone signal, which may optionally be made available to the separation means 250 or to the computing means 270.

The multichannel variant of the apparatus 200 as is shown in FIG. 12 further comprises an adaptive filter 210-1, 210-2, . . . for each microphone signal or each of the microphone signal inputs 280, said adaptive filter 210-1, 210-2, . . . being coupled, possibly via the optional time/frequency converter means 290-1, 290-2, . . . , to the respective inputs 280-1, 280-2, . . . . Accordingly, the adaptive filters 210-1, 210-2, . . . are coupled, possibly via a plurality of optional frequency/time converter means 300-1, 300-2, . . . , to an output 310-1, 310-2, . . . , respectively. The output signals which are filtered by the adaptive filters 210, are cleared of echoes or are spectrally modified, are then available to the apparatus 200 at said outputs 310.

The adaptive filters 210-1, 210-2, . . . are all coupled in parallel to the output of the computing means 270 at which output said computing means 270 provides the filter coefficients for the adaptive filters. In other words, all microphone signals of the plurality of microphone signals are filtered, in an embodiment of the present invention as is depicted in FIG. 12, with the same adaptive filter from a functional point of view, i.e. on the basis of the same filter coefficients, so as to obtain the spectrally modified, or echo-cancelled, versions of the corresponding microphone signals.

Thus, if $x_w[n]$ is the signal of the $w^{th}$ loudspeaker, where w is an integer ranging from 0 to W−1, and where W designates the number of the different loudspeakers or loudspeaker signals, a STFT-domain representation $X_w[k,m]$ of the w'th loudspeaker signal may be calculated.

A joint power spectrum for all loudspeaker channels is then computed by combining the spectra of the individual loudspeaker signal spectra:

$$|X[k,m]|^2 = \sum_{w=0}^{W-1} |Y_w[k,m]|^2, \quad (46)$$

where W denotes the number of loudspeaker channels.

By analogy therewith, a common or bundled power spectrum for the microphone channels is also computed in accordance with $$|Y[k,m]|^2 = \sum_{p=0}^{P-1} |Y_p[k,m]|^2, \quad (47)$$

where $Y_p[k,m]$ designates the signal of the $p^{th}$ microphone 110, and P represents the number of microphones. The index p again is an integer ranging from 0 to P−1. This computation is possibly performed, in the embodiment shown in FIG. 12, by the further bundling means 540.

For determining the echo removal filter in accordance with equation (25), the loudspeaker (power) spectra $|X[k,m]|^2$ in accordance with equation (46) and the microphone (power) spectrum $|Y[k,m]|^2$ in accordance with equation (47) are used during the further algorithmic steps, as were explained in the preceding paragraphs of the description. The determination of the control parameter β described in connection with the performance control in accordance with equations (38) to (41) may also be performed on the basis of the common or bundled spectra in accordance with equations (46) and (47).

The actual echo suppression within the context of the spectral modification is then performed individually for each microphone signal, but using the same echo removal filter 210 for each microphone channel in accordance with $$E_p[k,m] = H[k,m]Y_p[k,m] \quad (48)$$

for p=0, 1, . . . , P−1. By analogy therewith, the echo removal filters 210 may also be implemented differently, as was explained above.

In this context it is worth noting that within the context of the multichannel variant of the apparatus 200, as is shown, for example, in FIG. 12, the number W of the loudspeaker signals and the number P of the microphone signals should both be identical and different from each other. Any number of inputs may be provided, in principle, both for the loudspeaker signals and for the microphone signals. Also, it is not absolutely necessary to provide both a plurality of loudspeaker signal inputs and a plurality of microphone signal inputs with the corresponding bundling means 530, 540. In embodiments of the present invention, it is quite possible that only a plurality of loudspeaker signal inputs are implemented with a corresponding bundling means 530 without having to implement more than one microphone signal input with a corresponding further bundling means 540. Such a system may be employed, for example, when there is one single microphone but a plurality of loudspeakers, for example because the communication signal of the far-end subscriber is reproduced via a sound system comprising several loudspeakers, as may be implemented in motor cars, for example.

In addition, it is not necessary to possibly implement more than one input for a loudspeaker signal with a corresponding bundling means 530, when only one central loudspeaker, for example within the context of a conference system, is implemented, but a plurality of speakers each have a microphone of their own available to them. In such a case, only the implementation of the further bundling means 540 may possibly be advisable.

In addition, it is worth noting at this point that the bundling means 530, 540 may naturally be configured such that they are designed for more loudspeaker signals or microphone signals than are eventually provided to them. Accordingly, an apparatus 200 may possibly comprise more corresponding inputs 220, 280 than will eventually be used. In this case, for example, an upstream circuit, such as the optional time/frequency converter means 230, 290, or the bundling means 530, 540 themselves, may determine the number of active channels and select the parameters W and P accordingly. Of course, an external supply of the number of channels and possibly of the number of microphone and loudspeaker signals to be taken into account may also be implemented.

It should also be noted at this point that the embodiment shown in FIG. 12 naturally also works with only one single loudspeaker signal and one single microphone signal, if the corresponding parameters W and P are transmitted to the bundling means 530, 540. In principle, equations (46) and (47) are also applicable to the cases P=1 and/or W=1. Thus, the embodiment shown in FIG. 12 represents a "downward-compatible" extension of the embodiments shown e.g. in FIGS. 6 to 8 of this disclosure.

Temporal fluctuations of power spectra

In reference [11] it has been proposed to use temporal fluctuations of power spectra for an improved estimation of parameters used in acoustic echo suppression applications. The temporal fluctuations of the power spectra are determined as centered versions with respect to the corresponding mean values:

$$\tilde{Y}[k,m] = |Y[k,m]|^2 - E\{|Y[k,m]|^2\}$$

$$\tilde{X}_d[k,m] = |X_d[k,m]|^2 - E\{|X_d[k,m]|^2\} \quad (49)$$

In practice, the expectation operators are replaced by temporal averages, e.g. according to (8). The temporal fluctuations of the power spectra of the delayed loudspeaker signal $\tilde{X}_d[k,m]$ and the microphone signal $\tilde{y}[k,m]$ are then used in equations (18) and (19) in order to estimate the decay time constant $\tau_m$.

$$\left|\hat{Q}_{d_\tau}[k,m]\right|^2 = \frac{E\{\tilde{X}_{d_\tau}[k,m]\tilde{Y}[k,m]\}}{E\{\tilde{X}_{d_\tau}[k,m]\tilde{X}_{d_\tau}[k,m]\}}, \quad (50)$$

$$\left|\hat{Q}_{d_\tau+\Delta d_\tau}[k,m]\right|^2 = \frac{E\{\tilde{X}_{d_\tau+\Delta d_\tau}[k,m]\tilde{Y}[k,m]\}}{E\{\tilde{X}_{d_\tau+\Delta d_\tau}[k,m]\tilde{X}_{d_\tau+\Delta d_\tau}[k,m]\}}. \quad (51)$$

Alternatives to Short Time Fourier Transform

As regards the frequency resolution, it may possibly be advisable to deviate from that of an STFT. The uniform spectral resolution of an STFT is somewhat different to the spectral resolution of human perception. It may therefore possibly be advantageous to group the uniformly spaced-apart coefficients $|X[k, m]|^2$ and $|Y[k, m]|^2$ in a number of non-overlapping partitions or groups, as is also shown in Reference [9], these partitions or groups comprising bandwidths which mimic the frequency resolution of the human auditory system, as is represented, for example, in Reference [10].

For a sampling rate of 16 kHz, a DFT block length for the STFT of 512 samples and 15 groups or partitions is a reasonable choice, each partition having a bandwidth which roughly corresponds to double the equivalent rectangular bandwidth (ERB), as is described in Reference [10].

As the preceding description of embodiments of the present invention showed, embodiments of the present invention in some cases comprise functional units which include the following steps as a brief summary. Some embodiments of the present invention implement receiving at least one loudspeaker signal, receiving at least one microphone signal, converting the loudspeaker signal and the microphone signal to short-time spectra, computing corresponding loudspeaker and microphone power spectra, providing echo decay parameters from a predetermined echo decay model or dynamically estimated echo decay model, computing an echo removal gain filter modeling the echo which takes into account the echo decay parameters, applying the gain filter to the microphone spectrum so as to suppress the echo, and converting the echo-suppressed microphone spectrum to the time domain.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The processor may be comprised of a computer, a chip card (smart card), an integrated system (SOC=system on chip), an application-specific integrated circuit (ASIC) or any other integrated circuit (IC).

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] C. Breining, P. Dreiseitel, E. Hänsler, A. Mader, B. Nitsch, H. Puder, T. Schertler, G. Schmidt, and J. Tilp. Acoustic echo control. IEEE Signal Processing Magazine, 16(4): 42-69, July 1999.

[2] A. N. Birkett and R. A. Goubran. Limitations of hands-free acoustic echo cancellers due to nonlinear loudspeaker distortion and enclosure vibration effects. In Proc. IEEE Workshop on Applications of Signal Processing to Audio and Acoustics, pp. 13-16, New Paltz, October 1995.

[3] G. Schmidt and E. Hänsler. Acoustic echo and noise control: a practical approach. Hoboken: Wiley, 2004.

[4] W. L. B. Jeannes, P. Scalart, G. Faucon, and C. Beaugeant. Combined noise and echo reduction in hands-free systems: a survey. IEEE Transactions on Speech and Audio Processing, 9(8): 808-820, November 2001.

[5] C. Faller and J. Chen. Suppressing acoustic echo in a sampled auditory envelope space. IEEE Trans. on Speech and Audio Proc., 13(5): 1.048-1.062, September 2005.

[6] C. Faller and C. Tournery. Estimating the delay and coloration effect of the acoustic echo path for low complexity echo suppression. In Proc. Intl. Works. on Acoust. Echo and Noise Control (IWAENC), September 2005.

[7] W. Etter and G. S. Moschytz. Noise reduction by noise-adaptive spectral magnitude expansion. J. Audio Eng. Soc., 42: 341-349, May 1994.

[8] O. Capp'e. Elimination of the musical noise phenomenon with the ephrain and malah noise suppressor. IEEE Trans. Speech and Audio Processing, 2(2): 345-349, April 1994.

[9] C. Faller and F. Baumgarte. Binaural Cue Coding—Part II: Schemes and applications. IEEE Trans. on Speech and Audio Proc., 11(6): 520-531, November 2003.

[10] B. R. Glasberg and B. C. J. Moore. Derivation of auditory filter shapes from notched-noise data. Hear. Res., 47: 103-138, 1990.

[11] A. Favrot, C. Faller, M. Kallinger, F. Kuech, and M. Schmidt. Acoustic echo control based on temporal fluctuations of short-time spectra. In Proc. Intl. Works. on Acoust. Echo and Noise Control (IWAENC), September 2008.

[12] M. Berouti, R. Schwartz, and J. Makhoul. Enhancement of speech corrupted by musical noise. In Proc. ICASSP, pages 208-211, 1979.

The invention claimed is:

1. An apparatus for computing filter coefficients for an adaptive filter for filtering a microphone signal captured by a microphone so as to suppress an echo due to a loudspeaker signal output by a loudspeaker, comprising:
an echo decay modeller that models a decay behavior of an acoustic environment and provides a corresponding echo decay parameter;
a computing processor that computes the filter coefficients of the adaptive filter on the basis of the echo decay parameter and that determines an early echo removal filter and a late echo removal filter;
a filter setter that determines the filter coefficients of the adaptive filter by determining a linear combination of filter coefficients of the early echo removal filter and the late echo removal filter.

2. The apparatus as claimed in claim 1, wherein the echo decay parameter is an exponential decay coefficient and wherein the apparatus further comprises an echo estimator for estimating a reverberant echo component by a recursive computation using the exponential decay coefficient.

3. The apparatus as claimed in claim 1, further comprising an echo processor that estimates an echo frequency spectrum or an echo power spectrum of the echo within the microphone signal;
wherein the echo processor estimates an early echo component and a late echo component, at least the estimation of the late echo component using the echo decay parameter;
wherein the echo processor estimates the echo frequency spectrum or the echo power spectrum on the basis of the early echo component and the late echo component; and
wherein the computing processor computes the filter coefficients on the basis of the echo frequency spectrum or the echo power spectrum.

4. The apparatus as claimed in claim 3, wherein the echo processor comprises a maximum selector that selects a maximum echo estimation among the early echo estimation and the late echo estimation as the echo frequency spectrum or the echo power spectrum.

5. The apparatus as claimed in claim 3, wherein the echo processor determines the late echo component on the basis of a preceding value of the estimated echo frequency spectrum or a preceding value of the echo power spectrum, determined at a preceding instant, and on the basis of the echo decay parameter applied to the preceding value of the echo frequency spectrum or applied to the preceding value of the echo power spectrum to model a decay of the late echo estimation between the preceding instant and a subsequent instant.

6. The apparatus as claimed in claim 1, further comprising:
a first transformer that transforms at least one of the microphone signal and the loudspeaker signal from a time domain representation to a time-frequency representation in a time-frequency domain; and
a second transformer that transforms an echo suppressed signal from the time-frequency domain back to the time domain.

7. The apparatus as claimed in claim 1, wherein the echo decay modeller comprises an echo decay parameter estimator that evaluates the microphone signal with respect to an echo decay observable in the microphone signal and provides the resulting estimated echo decay parameter for further processing.

8. The apparatus as claimed in claim 7, wherein the echo decay parameter estimator determines the echo decay parameter on the basis of a provided reverberation time.

9. The apparatus as claimed in claim 8, wherein the echo decay parameter estimator also determines the provided reverberation time.

10. The apparatus as claimed in claim 1, wherein the computing processor determines the filter coefficients on the basis of a difference between a power spectrum of the microphone signal and an echo power spectrum.

11. The apparatus as claimed in claim 1, wherein the echo decay model determines a temporal average of a microphone signal power spectrum and a temporal average of a loudspeaker signal power spectrum, determines temporal fluctuations of the power spectra of the microphone signal and the loudspeaker signal via subtracting the temporal average from corresponding instantaneous power spectra, and includes the temporal fluctuations in the determination of the echo decay parameter.

12. A method for computing filter coefficients for an adaptive filter for filtering a microphone signal so as to suppress an echo due to a loudspeaker signal, comprising:
providing an echo decay parameter determined by an echo decay modeller;
determining an early echo removal filter and a late echo removal filter on the basis of the echo decay parameter; and
computing the filter coefficients of the adaptive filter by determining the echo decay parameters by determining a linear combination of filter coefficients of the early echo removal filter and the late echo removal filter.

13. The method as claimed in claim 12, wherein the echo decay parameter is an exponential decay coefficient and wherein the method further comprises:

estimating a reverberant echo component by a recursive computation that includes the exponential decay coefficient.

14. The method as claimed in claim 12, further comprising:
    estimating an early echo component and a late echo component, at least the estimation of the late echo component using the echo decay parameter; and
    determining an echo frequency spectrum or an echo power spectrum of the echo within the microphone signal as a combination of the early echo component and the late echo component;
    computing the filter coefficients on the basis of the echo frequency spectrum or the echo power spectrum.

15. A non-transitory computer readable medium including a program comprising a program code for performing, when the program runs on a processor, a method for computing filter coefficients for an adaptive filter for filtering a microphone signal so as to suppress an echo due to a loudspeaker signal, comprising:
    providing an echo decay parameter determined by an echo decay modeller;
    determining an early echo removal filter and a late echo removal filter on the basis of the echo decay parameter; and
    computing the filter coefficients of the adaptive filter on the basis of the echo decay parameters by determining a linear combination of filter coefficients of the early echo removal filter and the late echo removal filter.

16. An apparatus for computing filter coefficients for an adaptive filter for filtering a microphone signal captured by a microphone so as to suppress an echo due to a loudspeaker signal output by a loudspeaker, comprising:
    an echo decay modeller that models a decay behavior of an acoustic environment and provides a corresponding echo decay parameter;
    an echo processor that estimates an echo frequency spectrum or an echo power spectrum of the echo within the microphone signal, wherein the echo processor estimates an early echo component and a late echo component, at least the estimation of the late echo component using the echo decay parameter, and further estimates the echo frequency spectrum or the echo power spectrum on the basis of the early echo component and the late echo component; and
    a computing processor that computes the filter coefficients of the adaptive filter on the basis of the echo decay parameter and on the basis of the echo frequency spectrum or the echo power spectrum of the echo within the microphone signal;
    wherein the echo processor comprises a maximum selector that selects a maximum echo estimation among the early echo estimation and the late echo estimation as the echo frequency spectrum or the echo power spectrum.

17. A method for computing filter coefficients for an adaptive filter for filtering a microphone signal so as to suppress an echo due to a loudspeaker signal, comprising:
    providing echo decay parameters determined by an echo decay modeller;
    estimating an echo frequency spectrum or an echo power spectrum of the echo within the microphone signal, by estimating an early echo component and a late echo component, at least an estimation of the late echo component using the echo decay parameter;
    estimating the echo frequency spectrum or the echo power spectrum on the basis of the early echo component and the late echo component;
    selecting a maximum echo estimation among the early echo estimation and the late echo estimation as the echo frequency spectrum or the echo power spectrum; and
    computing the filter coefficients of the adaptive filter on the basis of the echo decay parameters and on the basis of an echo frequency spectrum or an echo power spectrum of an the echo within the microphone signal.

18. A non-transitory computer readable medium including a program comprising a program code for performing, when the program runs on a processor, a method for computing filter coefficients for an adaptive filter for filtering a microphone signal so as to suppress an echo due to a loudspeaker signal, comprising:
    providing echo decay parameters determined by an echo decay modeller;
    estimating an echo frequency spectrum or an echo power spectrum of the echo within the microphone signal, by estimating an early echo component and a late echo component, at least an estimation of the late echo component using the echo decay parameter;
    estimating the echo frequency spectrum or the echo power spectrum on the basis of the early echo component and the late echo component;
    selecting a maximum echo estimation among the early echo estimation and the late echo estimation as the echo frequency spectrum or the echo power spectrum; and
    computing the filter coefficients of the adaptive filter on the basis of the echo decay parameters and on the basis of an echo frequency spectrum or an echo power spectrum of an the echo within the microphone signal.

19. An apparatus for computing filter coefficients for an adaptive filter for filtering a microphone signal captured by a microphone so as to suppress an echo due to a loudspeaker signal output by a loudspeaker, comprising:
    an echo decay modeller that models a decay behavior of an acoustic environment and that provides a corresponding echo decay parameter;
    a computing processor that computes the filter coefficients of the adaptive filter on the basis of the echo decay parameter and that determines an early echo removal filter and a late echo removal filter; and
    a filter setter that determines the filter coefficients of the adaptive filter by conducting a minimum selection among the early echo removal filter and the late echo removal filter.

20. A method for computing filter coefficients for an adaptive filter for filtering a microphone signal so as to suppress an echo due to a loudspeaker signal, comprising:
    providing echo decay parameters determined by an echo decay modeller;
    computing the filter coefficients of the adaptive filter on the basis of the echo decay parameters by determining an early echo removal filter and a late echo removal filter; and
    determining the filter coefficients of the adaptive filter by conducting a minimum selection among the early echo removal filter and the late echo removal filter.

21. A non-transitory computer readable medium including a program comprising a program code for performing, when the program runs on a processor, a method for computing filter coefficients for an adaptive filter for filtering a microphone signal so as to suppress an echo due to a loudspeaker signal, comprising:

providing echo decay parameters determined by an echo decay modeller;
computing the filter coefficients of the adaptive filter on the basis of the echo decay parameters by determining an early echo removal filter and a late echo removal filter; and
determining the filter coefficients of the adaptive filter by conducting a minimum selection among the early echo removal filter and the late echo removal filter.

* * * * *

UNITED STATES PATENT AND TRADEMARK OFFICE
CERTIFICATE OF CORRECTION

PATENT NO. : 9,699,552 B2  
APPLICATION NO. : 13/867311  
DATED : July 4, 2017  
INVENTOR(S) : Fabian Kuech et al.

Page 1 of 1

It is certified that error appears in the above-identified patent and that said Letters Patent is hereby corrected as shown below:

On the Title Page

The second inventor listed in item (72) should read as follows:  
--Markus Schmidt, Loerrach (DE)--

The Assignee in item (73) should read as follows:  
--Fraunhofer-Gesellschaft zur Foerderung der angewandten Forschung e.V., Munich (DE)--

Signed and Sealed this  
Nineteenth Day of December, 2017

Joseph Matal  
*Performing the Functions and Duties of the*  
*Under Secretary of Commerce for Intellectual Property and*  
*Director of the United States Patent and Trademark Office*